US009701337B2

United States Patent
Chai et al.

(10) Patent No.: US 9,701,337 B2
(45) Date of Patent: Jul. 11, 2017

(54) STEERING CONTROL APPARATUS AND STEERING CONTROL METHOD

(71) Applicant: NISSAN MOTOR CO., LTD., Yokohama-shi, Kanagawa (JP)

(72) Inventors: Yu wun Chai, Isehara (JP); Takaaki Eguchi, Yokohama (JP); Yukinobu Matsushita, Isehara (JP); Kazuhiro Igarashi, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 32 days.

(21) Appl. No.: 14/354,324

(22) PCT Filed: Oct. 22, 2012

(86) PCT No.: PCT/JP2012/006756
§ 371 (c)(1),
(2) Date: Apr. 25, 2014

(87) PCT Pub. No.: WO2013/061567
PCT Pub. Date: May 2, 2013

(65) Prior Publication Data
US 2014/0303850 A1    Oct. 9, 2014

(30) Foreign Application Priority Data

Oct. 26, 2011  (JP) ................................ 2011-235241
Dec. 16, 2011  (JP) ................................ 2011-275531

(51) Int. Cl.
*B62D 6/00*    (2006.01)
*G01M 17/06*   (2006.01)

(52) U.S. Cl.
CPC ............. *B62D 6/008* (2013.01); *G01M 17/06* (2013.01)

(58) Field of Classification Search
CPC .............................. B62D 6/008; G01M 17/06
USPC .............................................................. 701/42
See application file for complete search history.

(56) References Cited

U.S. PATENT DOCUMENTS

| 6,271,637 B1 * | 8/2001 | Kushion | B62D 5/0487 318/433 |
| 2006/0081410 A1 * | 4/2006 | Phillips | B62D 5/065 180/421 |
| 2006/0259224 A1 * | 11/2006 | Auer et al. | 701/72 |
| 2007/0120511 A1 * | 5/2007 | Kobayashi | B62D 5/0466 318/432 |
| 2008/0185213 A1 * | 8/2008 | Mori et al. | 180/402 |

(Continued)

FOREIGN PATENT DOCUMENTS

| JP | 2000108914 A | 4/2000 |
| JP | 2006137215 A | 6/2006 |

(Continued)

*Primary Examiner* — Michael McCullough
*Assistant Examiner* — Michael E Butler
(74) *Attorney, Agent, or Firm* — Young Basile Hanlon & MacFarlane, P.C.

(57) ABSTRACT

A control computing unit allocates the current axial force and the transverse-G axial force at the predetermined allocation ratio to calculate a feedback axial force which is the steering-rack axial force. Then, the control computing unit drives the reaction force motor on the basis of the calculated feedback axial force. Additionally, the allocation ratio of the transverse-G axial force is set to be greater than the allocation ratio of the current axial force.

10 Claims, 9 Drawing Sheets

(56) References Cited

U.S. PATENT DOCUMENTS

| 2012/0136506 A1* | 5/2012 | Takeuchi et al. | 701/1 |
| 2012/0143399 A1* | 6/2012 | Noumura et al. | 701/1 |
| 2013/0166121 A1* | 6/2013 | Takeuchi et al. | 701/22 |
| 2016/0236708 A1* | 8/2016 | Lefler | B62D 5/0463 |

FOREIGN PATENT DOCUMENTS

| JP | 2006218888 A | 8/2006 |
| JP | 2008062668 A | 3/2008 |
| JP | 2008189107 A | 8/2008 |

* cited by examiner

ABSOLUTE VALUE OF TRANSVERSE ACCELERATION Gy

———: ABSOLUTE VALUE OF TIRE TRANSVERSE FORCE
- - - -: ABSOLUTE VALUE OF SELF-ALIGNING TORQUE

ABSOLUTE VALUE OF TRANSVERSE ACCELERATION Gy

ABSOLUTE VALUE OF TRANSVERSE ACCELERATION Gy

STEERING CONTROL APPARATUS AND STEERING CONTROL METHOD

CROSS REFERENCE TO RELATED APPLICATION

The present application claims priority to Japanese Patent Application Nos. 2011-235241, filed Oct. 26, 2011 and 2011-275531, filed Dec. 16, 2011, each incorporated herein in its entirety.

TECHNICAL FIELD

The present invention relates to a steer-by-wire type steering control apparatus in which a steering wheel is mechanically separated from wheels to be steered.

BACKGROUND

In the related art, for example, a technique described in Japanese Patent Application Laid-Open No. 2000-108914 is known as a technique of a steering control apparatus. In the technique according to the related art, a steering reaction force is generated on the basis of a rack axial force acting on a steering rack of a steering mechanism of a vehicle. Accordingly, in the technique according to the related art, a force (hereinafter, also referred to as a tire transverse force) acting on tires in the transverse direction is reflected in the steering reaction force.

SUMMARY

However, in the technique according to the related art, since the steering reaction force is generated on the basis of the rack axial force, an axial force sensor configured to detect the rack axial force is necessary. Accordingly, since the axial force sensor is relatively expensive, there is a possibility that the manufacturing cost of the steering control apparatus will increase. The present invention is made in view of the above-mentioned circumstances and an object thereof is to suppress an increase of the manufacturing cost.

In order to achieve the above-mentioned object, according to an aspect of the present invention, a current axial force and a transverse-G axial force are allocated at a predetermined allocation ratio to calculate a feedback axial force. According to the aspect of the present invention, a reaction force motor is driven on the basis of the calculated feedback axial force.

At this time, the allocation ratio of the transverse-G axial force is set to be greater than the allocation ratio of the current axial force when an absolute value of a transverse acceleration is less than a predetermined transverse acceleration threshold value.

DESCRIPTION OF EMBODIMENTS

Hereinafter, embodiments of the present invention will be described with reference to the accompanying drawings.

A vehicle A according to this embodiment is a vehicle including a so-called steer-by-wire type (SBW type) steering control apparatus in which a steering wheel 1 is mechanically separated from front wheels to be steered (hereinafter, referred to as steered wheels 2).

Figure 1:
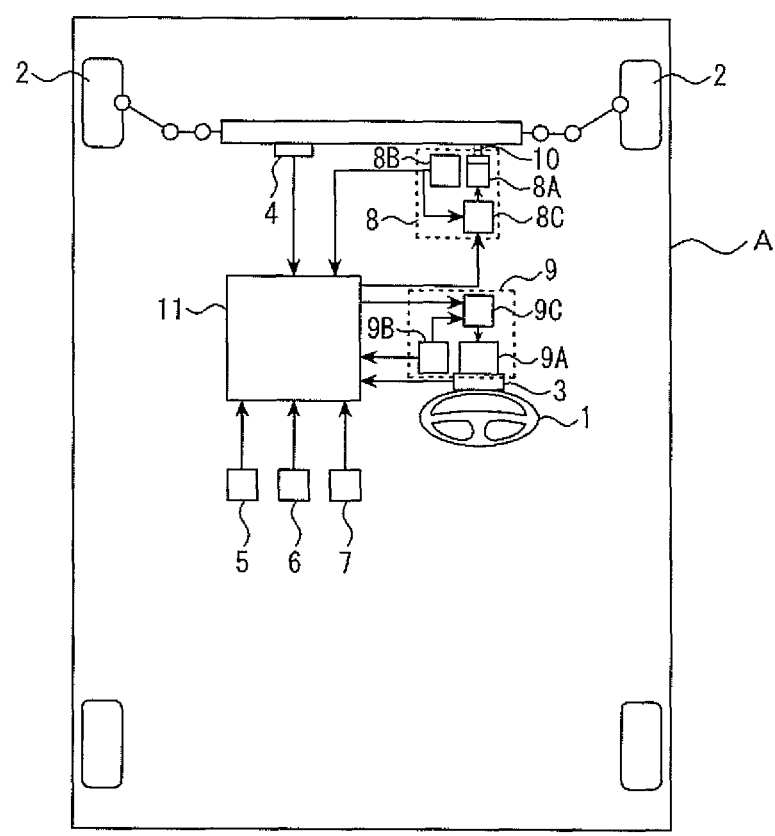
FIG. 1 is a conceptual diagram illustrating a configuration of a vehicle A.

FIG. 1 is a conceptual diagram illustrating a configuration of the vehicle A according to this embodiment. As illustrated in FIG. 1, the vehicle A includes a steering wheel angle sensor 3, a steering angle sensor 4, a vehicle speed sensor 5, a transverse G sensor 6, and a yaw rate sensor 7. The steering wheel angle sensor 3 detects a steering wheel angle δ of the steering wheel 1. The steering wheel angle sensor 3 outputs a signal (hereinafter, also referred to as a detection signal) indicating the detection result to a control computing unit 11 to be described later.

The steering angle sensor 4 detects a steering angle θ of the steered wheels 2. As a method of detecting the steering angle θ of the steered wheels 2, a calculation method based on a rack shift of a steering rack can be employed. The steering angle sensor 4 outputs a detection signal to the control computing unit 11.

The vehicle speed sensor 5 detects a vehicle speed V of the vehicle A. The vehicle speed sensor 5 outputs a detection signal to the control computing unit 11. The transverse G sensor 6 detects a transverse acceleration Gy of the vehicle A. The transverse G sensor 6 outputs a detection signal to the control computing unit 11. The yaw rate sensor 7 detects a yaw rate γ of the vehicle A. The yaw rate sensor 7 outputs a detection signal to the control computing unit 11. The transverse G sensor 6 and the yaw rate sensor 7 are disposed on a spring (vehicle body).

The vehicle A includes a steering control unit 8 and a reaction force control unit 9. The steering control unit 8 includes a steering motor 8A, a steering current detecting unit 8B, and a steering motor drive unit 8C. The steering motor 8A is coupled to a pinion shaft 10 via a reduction gear. The steering motor 8A is driven by the steering motor drive unit 8C and moves the steering rack in the lateral direction via the pinion shaft 10. Accordingly, the steering motor 8A steers the steered wheels 2. As a method of driving the steering motor 8A, a method of controlling a current (hereinafter, also referred to as a steering current) for driving the steering motor 8A can be employed.

The steering current detecting unit 8B detects a steering current. The steering current detecting unit 8B outputs a detection signal to the steering motor drive unit 8C and the control computing unit 11. The steering motor drive unit 8C controls the steering current of the steering motor 8A on the basis of a target steering current calculated by the control computing unit 11 so that the steering current detected by the steering current detecting unit 8B coincides with the target steering current. Accordingly, the steering motor drive unit 8C drives the steering motor 8A. The target steering current is a target value of the current for driving the steering motor 8A.

The reaction force control unit 9 includes a reaction force motor 9A, a reaction force current detecting unit 9B, and a reaction force motor drive unit 9C. The reaction force motor 9A is coupled to the steering shaft via a reduction gear. The reaction force motor 9A is drive by the reaction force motor drive unit 9C and applies a rotary torque to the steering wheel 1 via the steering shaft. Accordingly, the reaction force motor 9A generates a steering reaction force. As a method of driving the reaction force motor 9A, a method of controlling a current (hereinafter, also referred to as a reaction force current) for driving the reaction force motor 9A can be employed.

The reaction force current detecting unit 9B detects the reaction force current. The reaction force current detecting unit 9B outputs a detection signal to the reaction force motor drive unit 9C and the control computing unit 11. The reaction force motor drive unit 9C controls the reaction force current of the reaction force motor 9A on the basis of a target reaction force current calculated by the control computing unit 11 so that the reaction force current detected by the reaction force current detecting unit 9B coincides with the target reaction force current. Accordingly, the reaction force motor drive unit 9C drives the reaction force motor 9A. The target reaction force current is a target value of a current for driving the reaction force motor 9A.

Figure 2:
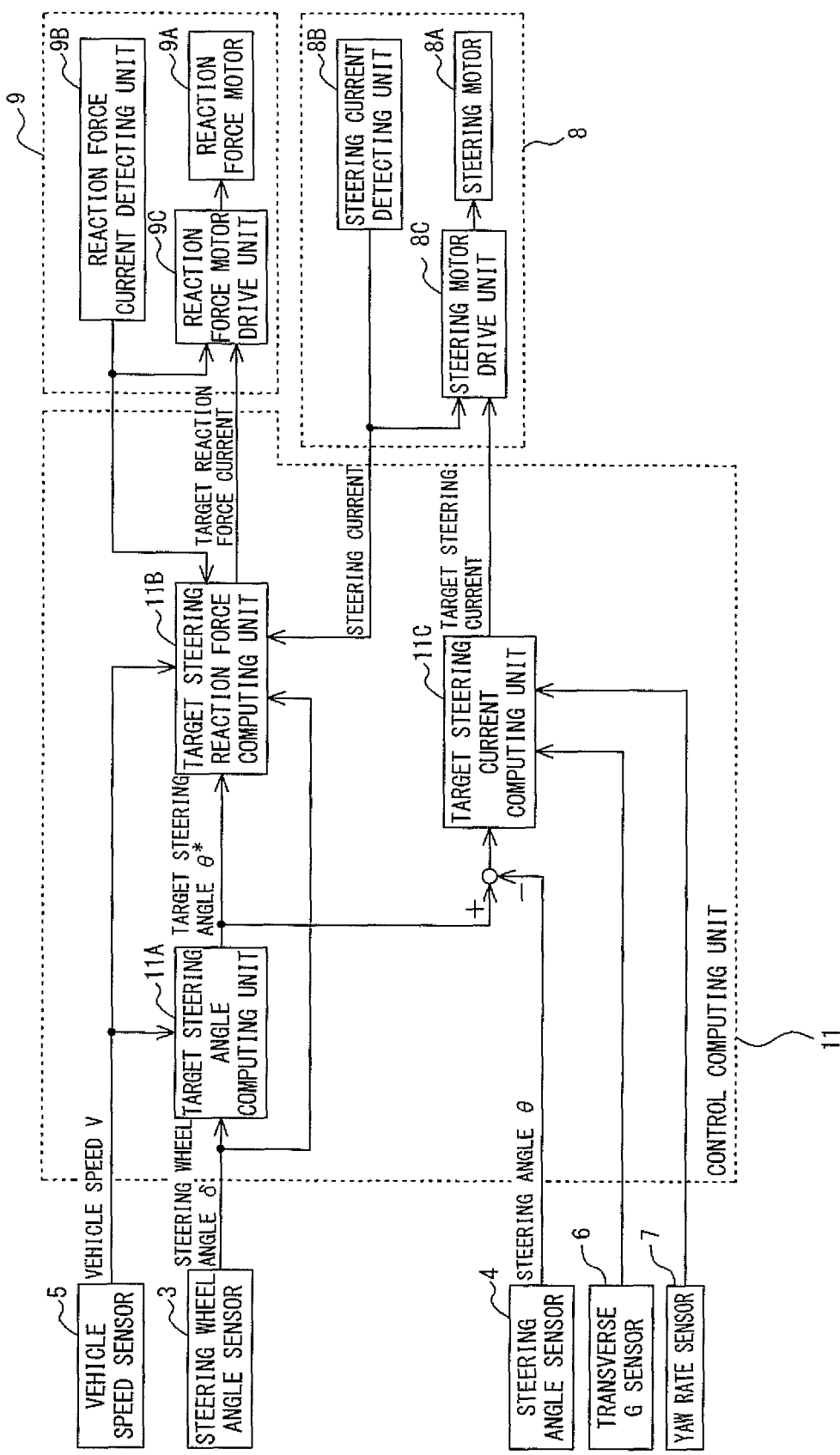
FIG. 2 is a block diagram illustrating a configuration of a control computing unit 11.

The vehicle A includes the control computing unit 11. FIG. 2 is a block diagram illustrating the configuration of the control computing unit 11. As illustrated in FIG. 2, the control computing unit 11 includes a target steering angle computing unit 11A, a target steering reaction force computing unit 11B, and a target steering current computing unit 11C. The target steering angle computing unit 11A calculates a target steering angle θ* which is a target value of the steering angle θ on the basis of the steering wheel angle δ detected by the steering wheel angle sensor 3 and the vehicle speed V detected by the vehicle speed sensor 5. The target steering angle computing unit 11A outputs the calculation result to the target steering reaction force computing unit 11B. The target steering reaction force computing unit 11B calculates the target reaction force current on the basis of the target steering angle θ* calculated by the target steering angle computing unit 11A, the vehicle speed V detected by the vehicle speed sensor 5, and the steering current detected by the steering current detecting unit 8B. The target steering reaction force computing unit 11B outputs the calculation result to the reaction force control unit 9 (the reaction force motor drive unit 9C).

Figure 3:
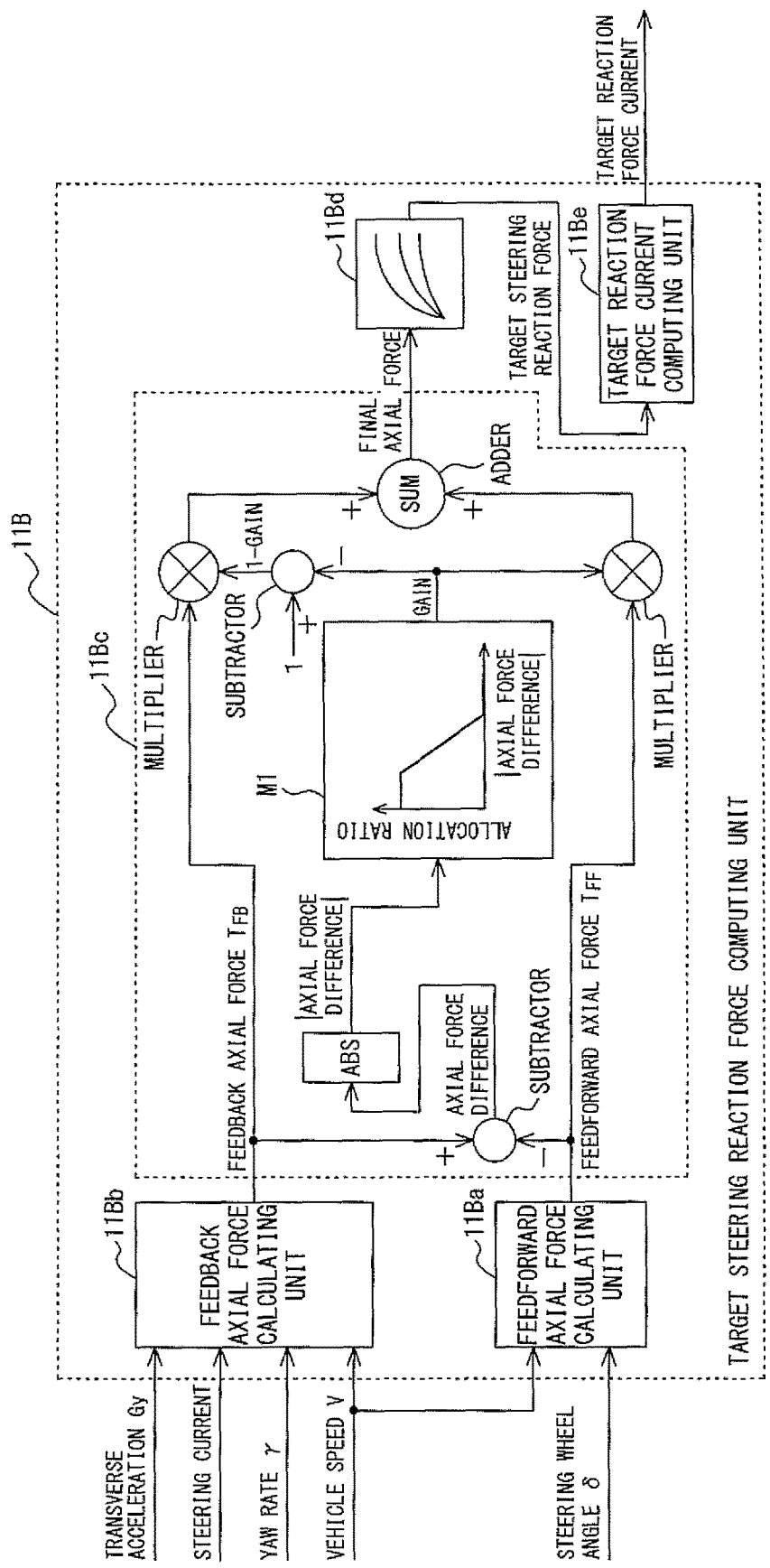
FIG. 3 is a block diagram illustrating a detailed configuration of a target steering reaction force computing unit 11B.

FIG. 3 is a block diagram illustrating the detailed configuration of the target steering reaction force computing unit 11B. The detailed configuration of the target steering reaction force computing unit 11B will be described below. As illustrated in FIG. 3, the target steering reaction force computing unit 11B includes a feedforward axial force calculating unit 11Ba, a feedback axial force calculating unit 11Bb, a final axial force calculating unit 11Bc, an axial force-steering reaction force conversion unit 11Bd, and a target reaction force current computing unit 11Be.

The feedforward axial force calculating unit 11Ba calculates a steering-rack axial force (hereinafter, also referred to as a feedforward axial force) $T_{FF}$ according to a formula (1) on the basis of the steering wheel angle δ detected by the steering wheel angle sensor 3 and the vehicle speed V detected by the vehicle speed sensor 5. The steering-rack axial force is a rack axial force which is applied to the steering rack. The feedforward axial force calculating unit 11Ba outputs the calculation result to the final axial force calculating unit 11Bc.

$$T_{FF}=(Ks+Css)/(JrS^2+(Cr+Cs)s+Ks)\cdot k\cdot V/(1+A\cdot V^2)\cdot \theta + Ks(Jrs^2+Crs)/(JrS^2+(Cr+Cs)s+Ks)\cdot \theta \quad (1)$$

Figure 4:
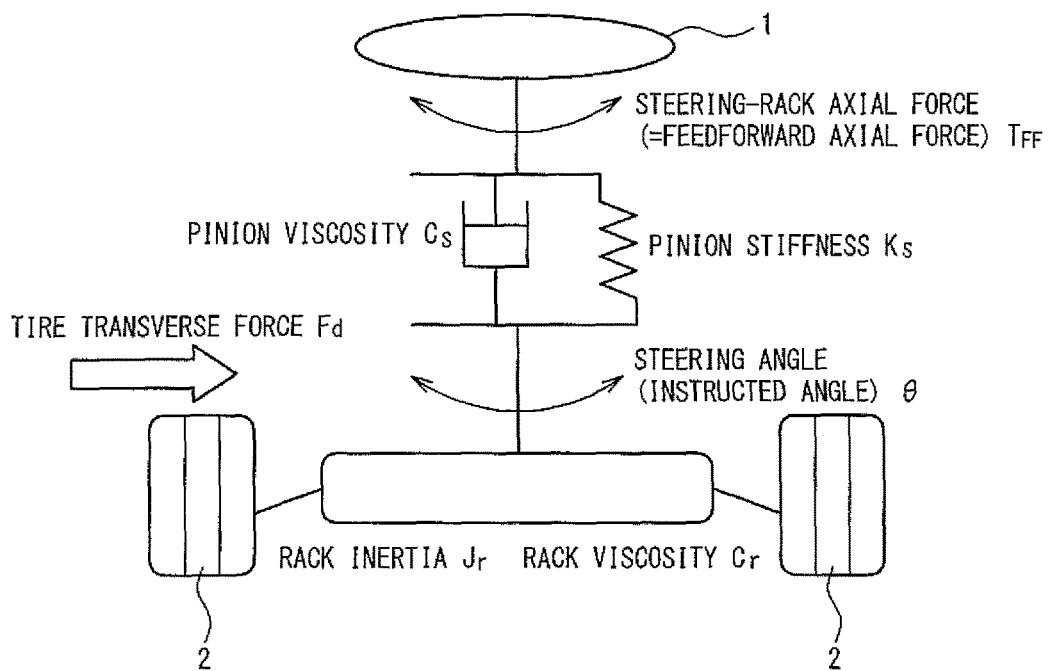
FIG. 4 is a diagram illustrating coefficients of a calculating formula for a feedforward axial force $T_{FF}$.

Here, as illustrated in FIG. 4, Ks represents pinion stiffness, Cs represents pinion viscosity, Jr represents rack inertia, Cr represents rack viscosity, and k and A are predetermined constants. Accordingly, the feedforward axial force calculating unit 11Ba calculates a steering-rack axial force not reflecting a tire transverse force Fd acting on the steered wheels 2 as the feedforward axial force $T_{FF}$.

Here, the formula (1) is a mathematical formula derived on the basis of a motion equation of a vehicle including a steering mechanism in which the steering wheel 1 and the steered wheels 2 are mechanically coupled to each other in a predetermined road surface state or a predetermined vehicle state. The first term of the right side of the formula (1) is a term representing a component based on the steering wheel angle δ and the vehicle speed V out of components of the feedforward axial force $T_{FF}$ and the second term of the right side is a term representing a component based on a steering wheel angular velocity. A term representing a component based on a steering wheel angular acceleration is excluded from the formula (1), because the term includes a lot of noise components and causes vibration of the calculation result of the feedforward axial force $T_{FF}$.

The feedback axial force calculating unit 11Bb calculates a steering-rack axial force (hereinafter, also referred to as a transverse-G axial force) according to a formula (2) on the basis of the transverse acceleration Gy (the state of the vehicle A) detected by the transverse G sensor 6. In the formula (2), a front wheel road and the transverse acceleration Gy are first multiplied and the multiplication result is calculated as an axial force (force in the axis direction) applied to the steered wheels 2. Subsequently, in the formula (2), the calculated axial force applied to the steered wheels 2 is multiplied by a constant (hereinafter, also referred to as a link ratio) based on an angle of a link or a suspension and the multiplication result is calculated as the transverse-G axial force.

Transverse-G axial force=axial force applied to steered wheels 2×link ratio $$\text{Axial force applied to steered wheels 2} = \text{front wheel load} \times \text{transverse acceleration } Gy \quad (2)$$

Figure 5:
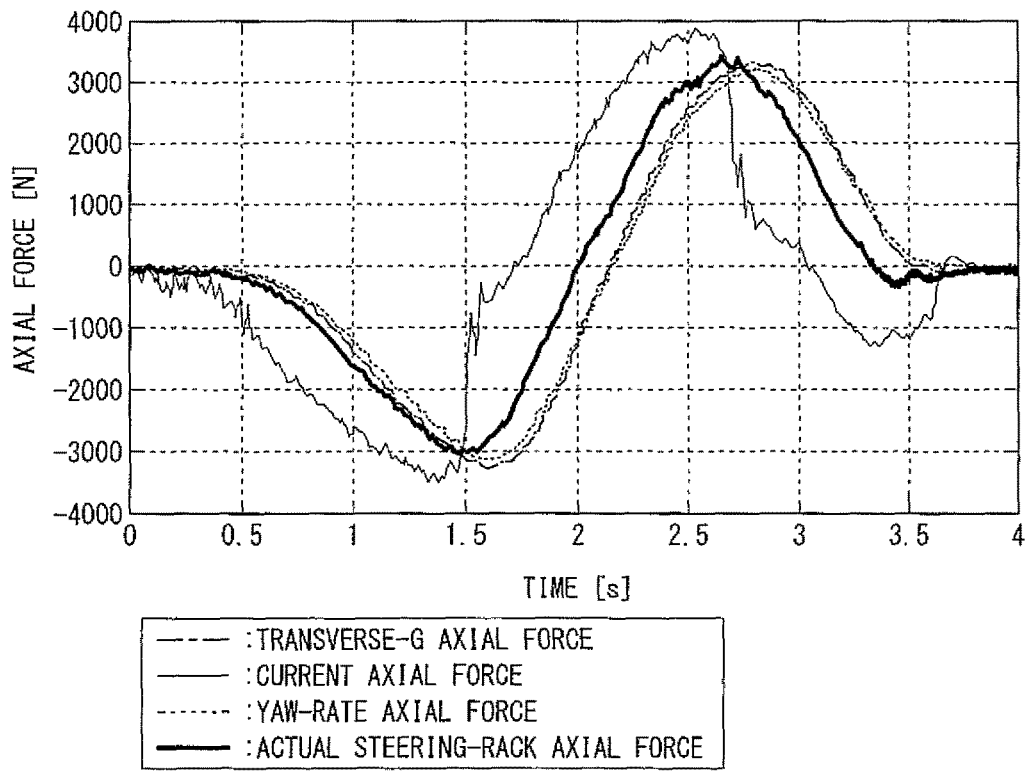
FIG. 5 is a graph illustrating a transverse-G axial force, a current axial force, a yaw-rate axial force, and an actual steering-rack axial force.

Here, the transverse acceleration Gy is generated by steering the steered wheels 2, applying the tire transverse force Fd to the steered wheels 2, and turning the vehicle A. Accordingly, the feedback axial force calculating unit 11Bb can calculate the steering-rack axial force (transverse-G axial force) reflecting the influence of the tire transverse force Fd acting on the steered wheels 2 on the basis of the transverse acceleration Gy. Here, since the transverse G sensor 6 is disposed on a spring (vehicle body), the detection of the transverse acceleration Gy delays. Accordingly, as illustrated in FIG. 5, the phase of the transverse-G axial force is later than that of the actual steering-rack axial force.

In this embodiment, an example where the transverse acceleration Gy detected by the transverse G sensor 6 is used to calculate the transverse-G axial force, but other configurations may be employed. For example, a configuration in which the vehicle speed V detected by the vehicle speed sensor 5 is multiplied by the yaw rate γ detected by the yaw rate sensor 7 and the multiplication result γ×V is used instead of the transverse acceleration Gy may be employed.

Referring to FIG. 3 again, the feedback axial force calculating unit 11Bb calculates a steering-rack axial force (hereinafter, also referred to as a current axial force) according to a formula (3) on the basis of the steering current (the state of the vehicle A) detected by the steering current detecting unit 8B. In the formula (3), first, the steering current, a torque constant (Nm/A) for calculating an output torque of the steering motor 8A on the basis of the steering current, and a motor gear ratio for transmitting a motor torque of the steering motor 8A are multiplied. Subsequently, in the formula (3), the multiplication result is divided by a pinion radius (m) of a pinion gear of the steering motor 8A, the division result is multiplied by efficiency for transmitting the output torque of the steering motor 8A, and the multiplication result is calculated as the current axial force.

$$\text{Current axial force} = \text{steering current} \times \text{motor gear ratio} \times \text{torque constant}(Nm/A)/\text{pinion radius}(m) \times \text{efficiency} \quad (3)$$

Here, the steering current varies by steering the steering wheel 1, changing the target steering angle θ\*, and causing a difference between the target steering angle θ\* and the actual steering angle θ. The steering current also varies by steering the steered wheels 2, applying the tire transverse force Fd to the steered wheels 2, and causing a difference between the target steering angle θ\* and the actual steering angle θ. The steering current also varies by applying road surface disturbance to the steered wheels 2 due to road surface unevenness or the like, applying the tire transverse force Fd to the steered wheels 2, and causing a difference between the target steering angle θ\* and the actual steering angle θ. Therefore, the feedback axial force calculating unit 11Bb can calculate the steering-rack axial force (current axial force) reflecting the influence of the tire transverse force Fd acting on the steered wheels 2 on the basis of the steering current. Here, the current axial force is generated at the time point at which a difference is generated between the target steering angle θ\* and the actual steering angle θ. Accordingly, as illustrated in FIG. 5, the phase of the current axial force is earlier than that of the actual steering-rack axial force or the actual transverse-G axial force.

Referring to FIG. 3 again, the feedback axial force calculating unit 11Bb calculates a steering-rack axial force (hereinafter, also referred to as a yaw-rate axial force) according to a formula (4) on the basis of the vehicle speed V detected by the vehicle speed sensor 5 (the state of the vehicle A) and the yaw rate γ (the state of the vehicle A) detected by the yaw rate sensor 7. In the formula (4), first, the front wheel load, the vehicle speed V, and the yaw rate γ are multiplied and the multiplication result is calculated as the axial force applied to the steered wheels 2. Subsequently, in the formula (4), the calculated axial force applied to the steered wheels 2 is multiplied by the link ratio and the multiplication result is calculated as the yaw-rate axial force.

$$\text{Yaw-rate axial force} = \text{axial force applied to steered wheels 2} \times \text{link ratio}$$

$$\text{Axial force applied to steered wheels 2} = \text{front wheel load} \times \text{vehicle speed } V \times \text{yaw rate } \gamma \quad (4)$$

Here, the yaw rate γ is generated by steering the steered wheels 2, applying the tire transverse force Fd to the steered wheels 2, and turning the vehicle A. Therefore, the feedback axial force calculating unit 11Bb can calculate the steering-rack axial force (yaw-rate axial force) reflecting the influence of the tire transverse force Fd acting on the steered wheels 2 on the basis of the yaw rate γ. Here, since the yaw rate sensor 7 is disposed on the spring (vehicle body), the detection of the yaw rate γ delays. Accordingly, as illustrated FIG. 5, the phase of the yaw-rate axial force is later than that of the actual steering-rack axial force.

The feedback axial force calculating unit 11Bb calculates a steering-rack axial force (hereinafter, also referred to as a "feedback axial force") according to a formula (5) on the basis of the calculated transverse-G axial force, the calculated current axial force, and the calculated yaw-rate axial force. In the formula (5), the transverse-G axial force is multiplied by an allocation ratio $K_1$, the current axial force is multiplied by an allocation ratio $K_2$, the yaw-rate axial force is multiplied by an allocation ratio $K_3$, and the sum of the multiplication results is calculated as the feedback axial force $T_{FB}$. That is, the feedback axial force $T_{FB}$ is calculated on the basis of the value obtained by multiplying the transverse-G axial force by the allocation ratio $K_1$, the value obtained by multiplying the current axial force by the allocation ratio $K_2$, and the value obtained by multiplying the yaw-rate axial force by the allocation ratio $K_3$. The feedback axial force calculating unit 11Bb outputs the calculation result to the final axial force calculating unit 11Bc.

$$T_{FB} = \text{transverse-}G \text{ axial force} \times K_1 + \text{current axial force} \times K_2 + \text{yaw-rate axial force} \times K_3 \quad (5)$$

Here, the allocation ratios $K_1$, $K_2$, and $K_3$ are allocation ratios of the transverse-G axial force, the current axial force, and the yaw-rate axial force, respectively. The magnitude relationship of the allocation ratios $K_1$, $K_2$, and $K_3$ is set to $K_1 > K_2 > K_3$. That is, the allocation ratios are set to be larger in the order of the transverse-G axial force, the current axial force, and the yaw-rate axial force. For example, the allocation ratios $K_1$, $K_2$, and $K_3$ are set to $K_1 = 0.6$, $K_2 = 0.3$, and $K_3 = 0.1$. Accordingly, the feedback axial force calculating unit 11Bb calculates the steering-rack axial force reflecting the influence of the tire transverse force Fd acting on the steered wheels 2 as the feedback axial force $T_{FB}$.

In this way, the feedback axial force calculating unit 11Bb according to this embodiment calculates the current axial force and the transverse-G axial force on the basis of the steering current of the steering motor 8A and the transverse acceleration Gy of the vehicle A. Then, the feedback axial force calculating unit 11Bb according to this embodiment calculates the feedback axial force $T_{FB}$ on the basis of the calculated current axial force and the transverse-G axial force. Therefore, the feedback axial force calculating unit 11Bb according to this embodiment can calculate the feedback axial force $T_{FB}$ on the basis of the detection results of the sensors (the steering current detecting unit 8B and the transverse G sensor 6) included in a general vehicle, such as the steering current of the steering motor 8A and the transverse acceleration Gy of the vehicle A. Accordingly, it is not necessary for the control computing unit 11 according to this embodiment to include a dedicated sensor such as an axial force sensor for detecting the steering-rack axial force and it is thus possible to suppress an increase in the manufacturing cost.

Figure 6:
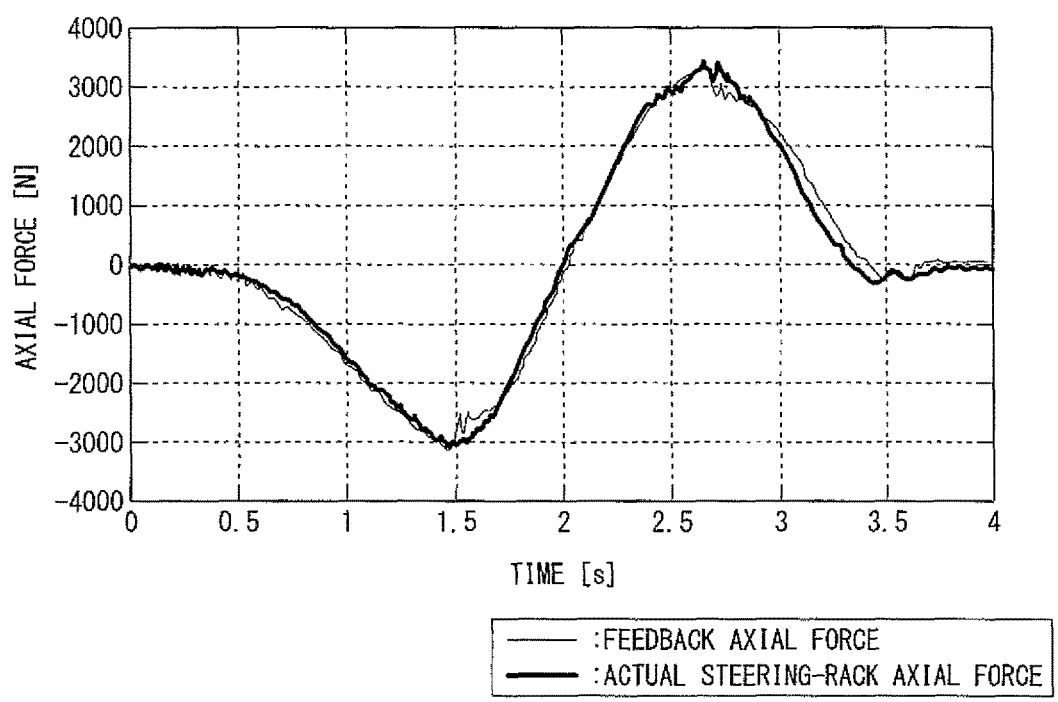
FIG. 6 is a graph illustrating a feedback axial force $T_{FB}$ and an actual steering-rack axial force.

The feedback axial force calculating unit 11Bb according to this embodiment calculates the feedback axial force $T_{FB}$ on the basis of the value obtained by multiplying the current axial force by the allocation ratio $K_2$ and the value obtained by multiplying the transverse-G axial force by the allocation ratio $K_1$. Here, as illustrated in FIG. 5, the phase of the transverse-G axial force is later than that of the actual steering-rack axial force. The phase of the current axial force is earlier than that of the actual steering-rack axial force. Therefore, the feedback axial force calculating unit 11Bb according to this embodiment can compensate for the phase delay due to the transverse-G axial force and can calculate a more appropriate feedback axial force $T_{FB}$ by adding the current axial force to the transverse-G axial force as illustrated in FIG. 6. Accordingly, the control computing unit 11 according to this embodiment can apply a more appropriate steering reaction force by driving the reaction force motor 9A on the basis of the feedback axial force $T_{FB}$.

Furthermore, the feedback axial force calculating unit 11Bb according to this embodiment calculates the feedback axial force $T_{FB}$ on the basis of a value obtained by multiplying the current axial force by the allocation ratio $K_2$ and a value obtained by multiplying the transverse-G axial force by the allocation ratio $K_1$. Here, when road surface disturbance due to road surface unevenness or the like acts on the steered wheels 2 of the vehicle A and a tire transverse force Fd acts on the steered wheels 2, a difference occurs between the target steering angle $\theta^*$ and the actual steering angle $\theta$. Therefore, the control computing unit 11 according to this embodiment can reflect the influence of the road surface disturbance acting on the steered wheels 2 due to the road surface unevenness or the like in the feedback axial force $T_{FB}$ by adding the current axial force to the transverse-G axial force and it is thus possible to calculate a more appropriate feedback axial force $T_{FB}$. Accordingly, the control computing unit 11 according to this embodiment can apply a more appropriate steering reaction force by driving the reaction force motor 9A on the basis of the feedback axial force $T_{FB}$.

The feedback axial force calculating unit 11Bb according to this embodiment sets the allocation ratio $K_1$ of the transverse-G axial force to be greater than the allocation ratio $K_2$ of the current axial force. Therefore, the feedback axial force calculating unit 11Bb according to this embodiment can reduce the allocation ratio of the current axial force and can suppress a decrease in estimation accuracy of the feedback axial force $T_{FB}$, for example, even when the estimation accuracy of the current axial force becomes lower than that of the actual steering-rack axial force due to an influence of inertia of the steering motor 8A or friction. Accordingly, the control computing unit 11 according to this embodiment can apply a more appropriate steering reaction force by driving the reaction force motor 9A on the basis of the feedback axial force $T_{FB}$.

Furthermore, the feedback axial force calculating unit 11Bb according to this embodiment calculates the feedback axial force $T_{FB}$ on the basis of a value obtained by multiplying the current axial force by the allocation ratio $K_2$, a value obtained by multiplying the transverse-G axial force by the allocation ratio $K_1$, and a value obtained by multiplying the yaw-rate axial force by the allocation ratio $K_3$. Here, when the vehicle A is in a spinning state, the steering current and the transverse acceleration Gy increase and thus both of the detection result of the transverse G sensor 6 and the detection result of the steering current detecting unit 8B reach the maximum values (saturated values). On the contrary, the yaw rate $\gamma$ increases, but since the degree of increase of the yaw rate $\gamma$ is relatively small, the detection result of the yaw rate sensor 7 does not reach the maximum value (saturated value). Accordingly, the detection result of the yaw rate sensor 7 varies depending on the degree of the spinning state of the vehicle A. Therefore, the feedback axial force $T_{FB}$ can vary depending on the degree of the spinning state of the vehicle A. As a result, the control computing unit 11 according to this embodiment can apply a more appropriate steering reaction force by driving the reaction force motor 9A on the basis of the feedback axial force $T_{FB}$.

Referring to FIG. 3 again, the final axial force calculating unit 11Bc reads the feedforward axial force $T_{FF}$ and the feedback axial force $T_{FB}$ from the feedforward axial force calculating unit 11Ba and the feedback axial force calculating unit 11Bb. Subsequently, the final axial force calculating unit 11Bc calculates a steering-rack axial force (hereinafter, referred to as a final axial force) according to a formula (6) on the basis of the read feedforward axial force $T_{FF}$ and the read feedback axial force $T_{FB}$. The final axial force calculating unit 11Bc outputs the calculation result to the axial force-steering reaction force conversion unit 11Bd.

$$\text{Final axial force} = \text{feedforward axial force } T_{FF} \times G_F - \text{feedback axial force } T_{FB} \times (1-G_F) \quad (6)$$

Here, $G_F$ represents a numerical value (hereinafter, referred to as an allocation ratio) representing the allocation ratio $G_F$ of the feedforward axial force $T_{FF}$ and the allocation ratio $(1-G_F)$ of the feedback axial force $T_{FB}$. The final axial force calculating unit 11Bc adds the feedforward axial force $T_{FF}$ and the feedback axial force $T_{FB}$ at a ratio of $G_F:(1-G_F)$ to calculate the final axial force.

In this way, the final axial force calculating unit 11Bc according to this embodiment calculates the final axial force on the basis of the feedback axial force $T_{FB}$ and the feedforward axial force $T_{FF}$. Here, the feedback axial force $T_{FB}$ reflects the influence of the tire transverse force Fd acting on the steered wheels 2 and thus varies depending on a variation in road surface state or a variation in vehicle state. On the contrary, the feedforward axial force $T_{FF}$ does not reflect the influence of the tire transverse force Fd and thus varies smoothly regardless of the variation in road surface state or the like. Therefore, the final axial force calculating unit 11Bc can calculate a more appropriate final axial force by calculating the final axial force on the basis of the feedforward axial force $T_{FF}$ in addition to the feedback axial force $T_{FB}$. As a result, the control computing unit 11 according to this embodiment can apply a more appropriate steering reaction force by driving the reaction force motor 9A on the basis of the feedback axial force $T_{FB}$.

Here, as the method of setting the allocation ratio $G_F$, a method of reading an allocation ratio $G_F$ corresponding to an axial force difference from an allocation ratio map M1. The axial force difference is a difference between the feedforward axial force $T_{FF}$ and the feedback axial force $T_{FB}$. Specifically, the axial force difference is a subtraction result obtained by subtracting the feedback axial force $T_{FB}$ from the feedforward axial force $T_{FF}$. The allocation ratio map M1 is a map in which an allocation ratio $G_F$ corresponding to the axial force difference is registered.

Here, the feedforward axial force $T_{FF}$ is calculated according to the formula (1) derived on the basis of a predetermined road surface state or a predetermined vehicle state. Therefore, the estimation accuracy of the feedforward axial force $T_{FF}$ decreases when the road surface state or the vehicle state varies. On the contrary, the estimation accuracy of the feedback axial force $T_{FB}$ is almost constant regardless of the road surface state or the vehicle state. Accordingly, the final axial force calculating unit 11Bc according to this embodiment uses the axial force difference, which is a difference between the feedforward axial force $T_{FF}$ and the feedback axial force $T_{FB}$, as an index for setting the allocation ratio $G_F$, that is, the allocation ratio of the feedforward axial force $T_{FF}$ and the allocation ratio of the feedback axial force $T_{FB}$. Accordingly, the final axial force calculating unit 11Bc according to this embodiment can set a more appropriate allocation ratio $G_F$.

Figure 7:
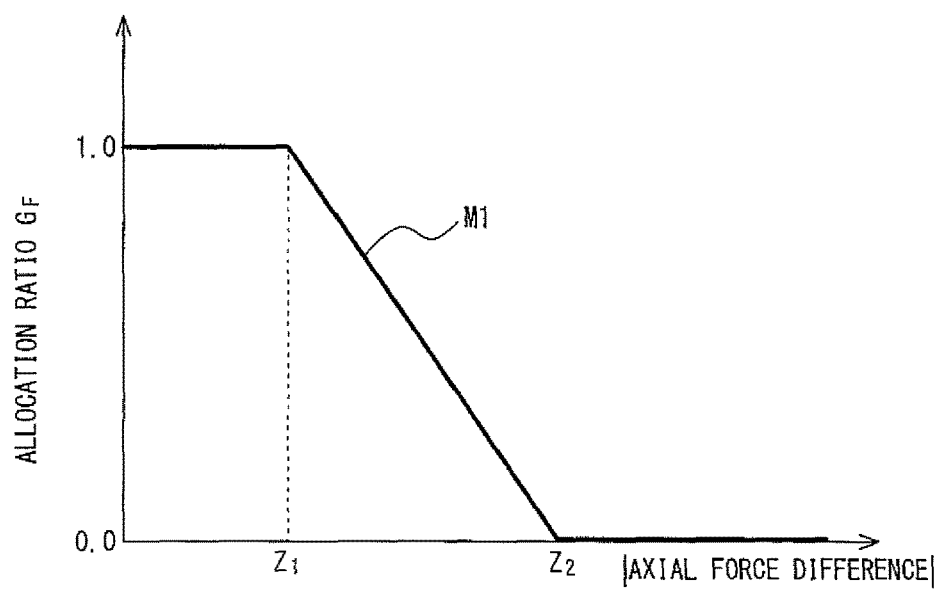
FIG. 7 is a graph illustrating an allocation ratio map M1.

FIG. 7 is a graph illustrating an allocation ratio map M1. As illustrated in FIG. 7, in the allocation ratio map M1, the allocation ratio $G_F$ is set to a value greater than the allocation ratio $(1-G_F)$ (for example, "1") regardless of the magnitude of the axial force difference in a range in which the absolute value of the axial force difference is equal to or greater than 0 and less than a first set value $Z_1$ (>0). The first set value $Z_1$ is an axial force difference (threshold value) at which the estimation accuracy of the feedforward axial force $T_{FF}$ starts decreasing. In the allocation ratio map M1, the allocation ratio $G_F$ is set to a value smaller than the allocation ratio $(1-G_F)$ (for example, "0.0") regardless of the magnitude of the axial force difference in a range in which the absolute value of the axial force difference is equal to or greater than a second set value $Z_2$ (>$Z_1$). The second set value $Z_2$ is an axial force difference (threshold value) at which the estimation accuracy of the feedforward axial force $T_{FF}$ is lower than the estimation accuracy of the feedback axial force $T_{FB}$.

In the allocation ratio map M1, the allocation ratio $G_F$ is made to linearly decrease with an increase of the absolute value of the axial force difference in a range in which the absolute value of the axial force difference is equal to or greater than the first set value $Z_1$ and less than the second set value $Z_2$. Specifically, in the allocation ratio map M1, the allocation ratio $G_F$ can be calculated according to a linear function representing the relationship between the absolute value of the axial force difference and the allocation ratio $G_F$ by the allocation ratio based on the axial force difference in the range in which the absolute value of the axial force difference is equal to or greater than the first set value $Z_1$ and less than the second set value $Z_2$. In the linear function, the allocation ratio $G_F$ is set to "1" when the absolute value of the axial force difference is equal to the first set value $Z_1$, and the allocation ratio $G_F$ is set to "0" when the absolute value of the axial force difference is equal to the second set value $Z_2$. Accordingly, when the absolute value of the axial force difference is less than the first set value $Z_1$, the final axial force calculating unit 11Bc sets the feedforward axial force $T_{FF}$ as the final axial force. When the absolute value of the axial force difference is equal to or greater than the second set value $Z_2$, the final axial force calculating unit 11Bc sets the feedback axial force $T_{FB}$ as the final axial force. In the allocation ratio map M1, when the absolute value of the axial force difference is equal to or greater than the first set value $Z_1$ and less than the second set value $Z_2$, the sum of the value obtained by multiplying the feedforward axial force $T_{FF}$ by the allocation ratio $G_F$ and the value obtained by the feedback axial force $T_{FB}$ by the allocation ratio $(1-G_F)$ is set as the final axial force.

Referring to FIG. 3 again, the axial force-steering reaction force conversion unit 11Bd calculates the target steering reaction force on the basis of the final axial force calculated by the final axial force calculating unit 11Bc. The target steering reaction force is a target value of the steering reaction force. As the method of calculating the target steering reaction force, a method of reading the target steering reaction force corresponding to the vehicle speed V and the final axial force from an axial force-steering reaction force conversion map can be employed. The axial force-steering reaction force conversion map is a map which is set for each vehicle speed V and in which a target steering reaction force corresponding to a final axial force is registered.

Figure 8:
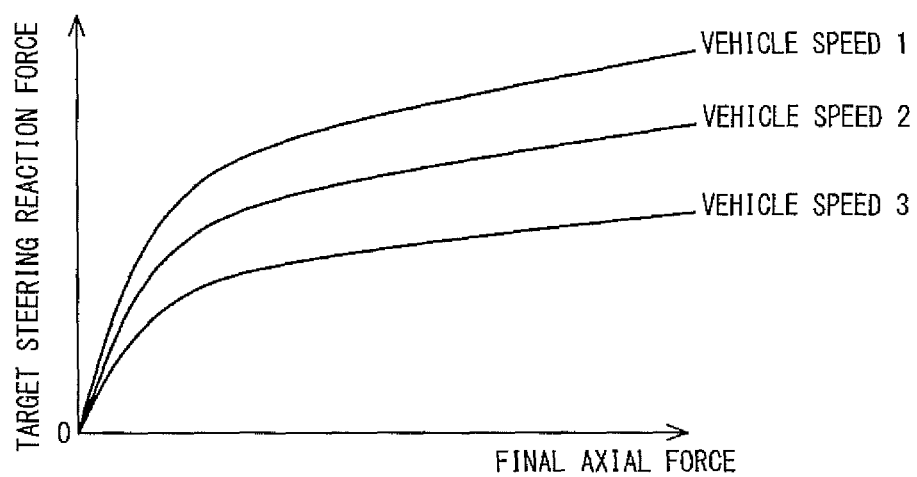
FIG. 8 is a graph illustrating an axial force-steering reaction force conversion map.

FIG. 8 is a graph illustrating the axial force-steering reaction force conversion map. As illustrated in FIG. 8, the axial force-steering reaction force conversion map is set for each vehicle speed V. In the axial force-steering reaction force conversion map, the larger the final axial force is, the larger value the target steering reaction force is set to.

Referring to FIG. 3 again, the target reaction force current computing unit 11Be calculates the target reaction force current according to a formula (7) on the basis of the target steering reaction force calculated by the axial force-steering reaction force conversion unit 11Bd. Then, the target reaction force current computing unit 11Be outputs the calculation result to the reaction force motor drive unit 9C.

Target reaction force current=target steering reaction force×gain  (7)

Referring to FIG. 2 again, the target steering current computing unit 11C calculates the target steering current on the basis of the subtraction result obtained by subtracting the steering angle θ detected by the steering angle sensor 4 from the target steering angle θ* calculated by the target steering angle computing unit 11A. The target steering current computing unit 11C outputs the calculation result to the steering motor drive unit 8C.

The operation of the steering control apparatus of the vehicle A will be described below. It is assumed that a driver steers the steering wheel 1 while the vehicle A is traveling. Then, the control computing unit 11 calculates the target steering angle θ* on the basis of the steering wheel angle δ and the vehicle speed V (the target steering angle computing unit 11A illustrated in FIG. 2). Subsequently, the control computing unit 11 calculates the target steering current on the basis of the subtraction result obtained by subtracting the actual steering angle θ from the calculated target steering angle θ* (the target steering current computing unit 11C illustrated in FIG. 2). Accordingly, the steering control unit 8 steers the steered wheels 2 in response to the driver's steering operation.

The control computing unit 11 also calculates the feedforward axial force $T_{FF}$ on the basis of the steering wheel angle δ and the vehicle speed V (the feedforward axial force calculating unit 11Ba illustrated in FIG. 3). Subsequently, the control computing unit 11 calculates the transverse-G axial force on the basis of the transverse acceleration Gy (the feedback axial force calculating unit 11Bb illustrated in FIG. 3). Subsequently, the control computing unit 11 calculates the current axial force on the basis of the steering current (the feedback axial force calculating unit 11Bb illustrated in FIG. 3). Subsequently, the control computing unit 11 calculates the yaw-rate axial force on the basis of the yaw rate γ and the vehicle speed V (the feedback axial force calculating unit 11Bb illustrated in FIG. 3). Subsequently, the control computing unit 11 calculates the feedback axial force $T_{FB}$ on the basis of the value obtained by multiplying the calculated current axial force by the allocation ratio $K_2$, the value obtained by multiplying the transverse-G axial force by the allocation ratio $K_1$, and the value obtained by multiplying the calculated transverse-G axial force by the allocation ratio $K_3$ (the feedback axial force calculating unit 11Bb illustrated in FIG. 3). The allocation ratios $K_1$, $K_2$, and $K_3$ of the transverse-G axial force, the current axial force, and the yaw-rate axial force are set to 0.6:0.3:0.1 (the feedback axial force calculating unit 11Bb illustrated in FIG. 3).

Subsequently, the control computing unit 11 allocates the calculated feedforward axial force $T_{FF}$ and the calculated feedback axial force $T_{FB}$ at $G_F$:$(1-G_F)$ and calculates the final axial force (the final axial force calculating unit 11Bc illustrated in FIG. 3). Subsequently, the control computing unit 11 calculates the target steering reaction force on the basis of the calculated final axial force (the axial force-steering reaction force conversion unit 11Bd illustrated in FIG. 3). Subsequently, the control computing unit 11 calculates the target reaction force current on the basis of the calculated target steering reaction force (the target reaction force current computing unit 11Be illustrated in FIG. 3). Subsequently, the control computing unit 11 drives the reaction force motor 9A on the basis of the calculated target reaction force current (the reaction force motor drive unit 9C illustrated in FIG. 2). Accordingly, the reaction force control unit 9 applies the steering reaction force to the steering wheel 1.

In this way, in the steering control apparatus according to this embodiment, the current axial force and the transverse-G axial force are calculated on the basis of the steering current of the steering motor 8A and the transverse acceleration Gy of the vehicle A. In the steering control apparatus according to this embodiment, the feedback axial force $T_{FB}$ is calculated on the basis of the calculated current axial force and the calculated transverse-G axial force. Therefore, the steering control apparatus according to this embodiment can calculate the feedback axial force $T_{FB}$ on the basis of the detection results of the sensors (the steering current detecting unit 8B and the transverse G sensor 6) included in a general vehicle, such as the steering current of the steering motor 8A and the transverse acceleration Gy of the vehicle A. Accordingly, since the steering control apparatus according to this embodiment drives the reaction force motor 9A on the basis of the feedback axial force $T_{FB}$, it is not necessary to include a dedicated sensor for detecting a steering rack axial force and it is thus possible to suppress an increase in the manufacturing cost.

In the steering control apparatus according to this embodiment, the feedback axial force $T_{FB}$ is calculated on the basis of a value obtained by multiplying the current axial force by the allocation ratio $K_2$ and a value obtained by multiplying the transverse-G axial force by the allocation ratio $K_1$. Here, as illustrated in FIG. 5, the phase the transverse-G axial force is later than the phase of the actual steering-rack axial force. The phase of the current axial force is earlier than the phase of the actual steering-rack axial force. Therefore, in the steering control apparatus according to this embodiment, it is possible to compensate for the phase delay due to the transverse-G axial force as illustrated in FIG. 6 by adding the current axial force to the transverse-G axial force and thus to calculate a more appropriate feedback axial force $T_{FB}$. Accordingly, in the steering control apparatus according to this embodiment, it is possible to apply a more appropriate steering reaction force on the basis of the feedback axial force $T_{FB}$.

In the steering control apparatus according to this embodiment, the allocation ratio $K_1$ "0.6" of the transverse-G axial force is set to be greater than the allocation ratio $K_2$ "0.3" of the current axial force. Therefore, in the steering control apparatus according to this embodiment, it is possible to decrease the allocation ratio $K_2$ of the current axial force. For example, even when the estimation accuracy of the current axial force is lower than that of the actual steering-rack axial force due to an influence of inertia of the steering motor 8A or friction, it is possible to suppress a decrease of the estimation accuracy of the feedback axial force $T_{FB}$. Accordingly, in the steering control apparatus according to this embodiment, it is possible to apply a more appropriate steering reaction force by driving the reaction force motor 9A on the basis of the feedback axial force $T_{FB}$.

Here, it is assumed that road surface disturbance acts on the steered wheels 2 due to road surface unevenness or the like while the vehicle A is traveling. Then, the tire transverse force Fd acts on the steered wheels 2 and a difference is generated between the target steering angle θ* and the actual steering angle θ. Accordingly, the steering current of the steering motor 8A increases and the detection result of the steering current detecting unit 8b varies depending on a degree of road surface disturbance acting on the steered wheels 2. Therefore, it is possible to reflect the influence of the road surface disturbance in the feedback axial force $T_{FB}$ and to calculate a more appropriate feedback axial force $T_{FB}$. Accordingly, the control computing unit 11 changes the feedback axial force $T_{FB}$ depending on the degree of road surface disturbance acting on the steered wheels 2 (the feedback axial force calculating unit 11Bb illustrated in FIG. 3). As a result, the reaction force control unit 9 applies a more appropriate steering reaction force. At this time, since the target steering current computing unit 11C calculates the target steering current so as to reduce the difference between the target steering angle θ* and the actual steering angle θ, both the detection results of the transverse G sensor 6 and the detection result of the yaw rate sensor 7 do not almost vary.

It is assumed that the vehicle A is changed to a spinning state while the vehicle A is traveling. Then, the tire transverse force Fd acting on the steered wheels 2 increases, the steering angle θ of the steered wheels 2 varies, and a difference is generated between the target steering angle θ* and the actual steering angle θ. Accordingly, the steering current of the steering motor 8A increases and the detection result of the steering current detecting unit 8b becomes a maximum value (saturated value). The vehicle A skids and turns. Accordingly, the transverse acceleration Gy of the vehicle A increases and the detection result of the transverse G sensor 6 becomes a maximum value (saturated value). Therefore, the detection result of the transverse G sensor 6 and the detection result of the steering current detecting unit 8B become constant (saturated values) regardless of the degree of spinning state of the vehicle A. On the other hand, the yaw rate γ also increases with the skid and turning of the vehicle A. However, since the degree of increase of the yaw rate γ is relatively small, the detection result of the yaw rate sensor 7 does not reach a maximum value (saturated value). Accordingly, the detection result of the yaw rate sensor 7 varies depending on the degree of the spinning state of the vehicle A. Therefore, the control computing unit 11 changes the feedback axial force $T_{FB}$ depending on the degree of the spinning state of the vehicle A (the feedback axial force calculating unit 11Bb illustrated in FIG. 3). As a result, the reaction force control unit 9 applies a more appropriate steering reaction force.

In this embodiment, the steering wheel 1 illustrated in FIG. 1 corresponds to the steering wheel. Similarly, the steering wheel angle sensor 3 illustrated in FIG. 1 corresponds to the steering wheel angle detecting unit. The steering motor 8A illustrated in FIG. 1 corresponds to the steering motor. The steering motor drive unit 8C illustrated in FIG. 1 corresponds to the steering motor drive unit. The steering current detecting unit 8B illustrated in FIG. 1 corresponds to the steering current detecting unit. The transverse G sensor 6 illustrated in FIG. 1 corresponds to the transverse acceleration detecting unit. The reaction force motor 9A illustrated in FIG. 1 corresponds to the reaction force motor. The feedback axial force calculating unit 11Bb illustrated in FIG. 3 corresponds to the current axial force calculating unit, the transverse-G axial force calculating unit, the feedback axial force calculating unit, and the yaw-rate axial force calculating unit. The allocation ratio $K_2$ corresponds to the first allocation ratio. The allocation ratio $K_1$ corresponds to the second allocation ratio. The allocation ratio $K_3$ corresponds to the third allocation ratio. The reaction force motor drive unit 9C and the target steering reaction force computing unit 11B illustrated in FIG. 1 correspond to the reaction force motor drive unit. The yaw rate sensor 7 illustrated in FIG. 1 corresponds to the yaw rate detecting unit. The vehicle speed sensor 5 illustrated in FIG. 1 corresponds to the vehicle speed detecting unit. The feedforward axial force calculating unit 11Ba illustrated in FIG. 1 corresponds to the feedforward axial force calculating unit.

This embodiment has the following effects.

(1) The control computing unit 11 allocates the current axial force and the transverse-G axial force at predetermined allocation ratios $K_2$ and $K_1$ and calculates the feedback axial force $T_{FB}$ which is a steering-rack axial force. Then, the control computing unit 11 drives the reaction force motor 9A on the basis of the calculated feedback axial force $T_{FB}$. The allocation ratio $K_1$ of the transverse-G axial force is set to be greater than the allocation ratio $K_2$ of the current axial force. According to this configuration, it is possible to drive the reaction force motor 9A on the basis of the detection results of the sensors included in a general vehicle, such as the steering current of the steering motor 8A and the transverse acceleration Gy. Therefore, it is not necessary to provide a dedicated sensor and it is thus possible to suppress an increase in the manufacturing cost.

The current axial force and the transverse-G axial force are allocated at predetermined allocation ratios $K_2$ and $K_1$ to calculate the feedback axial force $T_{FB}$. Therefore, it is possible to compensate for the phase delay due to the transverse-G axial force. Accordingly, it is possible to calculate a more appropriate feedback axial force $T_{FB}$ and thus to apply a more appropriate steering reaction force. For example, when road surface disturbance acts on the steered wheels 2 due to road surface unevenness or the like, the tire transverse force Fd acts on the steered wheels 2, and a difference is generated between the target steering angle $\theta^*$ and the actual steering angle $\theta$, it is possible to change the feedback axial force $T_{FB}$ depending on the degree of road surface disturbance acting on the steered wheels 2. Accordingly, it is possible to calculate a more appropriate feedback axial force $T_{FB}$ and thus to apply a more appropriate steering reaction force.

The allocation ratio $K_1$ of the transverse-G axial force is set to be greater than the allocation ratio $K_2$ of the current axial force. Therefore, for example, even when the estimation accuracy of the current axial force becomes lower than that of the actual steering-rack axial force due to the influence of inertia of the steering motor 8A or friction, it is possible to suppress a decrease in the estimation accuracy of the feedback axial force $T_{FB}$. Accordingly, it is possible to calculate a more appropriate feedback axial force $T_{FB}$ and thus to apply a more appropriate steering reaction force.

(2) The control computing unit 11 allocates the current axial force, the transverse-G axial force, and the yaw-rate axial force at the predetermined allocations ratios $K_2$, $K_1$, and $K_3$ and calculates the feedback axial force $T_{FB}$. According to this configuration, for example, when the vehicle A is in a spinning state, the steering current and the transverse acceleration Gy increase and thus both the detection result of the transverse G sensor 6 and the detection result of the steering current detecting unit 8B become the maximum values (saturated values). On the other hand, the yaw rate γ increases, but since the degree of increase of the yaw rate γ is relatively small, the detection result of the yaw rate sensor 7 does not reach the maximum value (saturated value). Accordingly, the detection result of the yaw rate sensor 7 varies depending on the degree of the spinning state of the vehicle A. Therefore, it is possible to change the feedback axial force $T_{FB}$ depending on the degree of the spinning state of the vehicle A. As a result, it is possible to calculate a more appropriate feedback axial force $T_{FB}$ and thus to apply a more appropriate steering reaction force.

(3) The control computing unit 11 allocates the steering wheel angle δ of the steering wheel 1 and the vehicle speed V of the vehicle A at the allocation ratios $G_F$ and $(1-G_F)$ and calculates the feedforward axial force. Then, the control computing unit 11 drives the reaction force motor 9A on the basis of the feedback axial force and the feedforward axial force. According to this configuration, since the reaction force motor 9A is driven on the basis of the feedforward axial force in addition to the feedback axial force, it is possible to apply a more appropriate steering reaction force.

Second Embodiment

A second embodiment of the present invention will be described below with reference to the accompanying drawings. The same elements as in the first embodiment will be referenced by the same reference signs. This embodiment is different from the first embodiment, in that the allocation ratio K2 of the current axial force increases with an increase of the absolute value of the transverse acceleration Gy of the vehicle A when the absolute value of the transverse acceleration Gy of the vehicle A is equal to or greater than a first set value $G_1$ to be described later.

Figure 9:
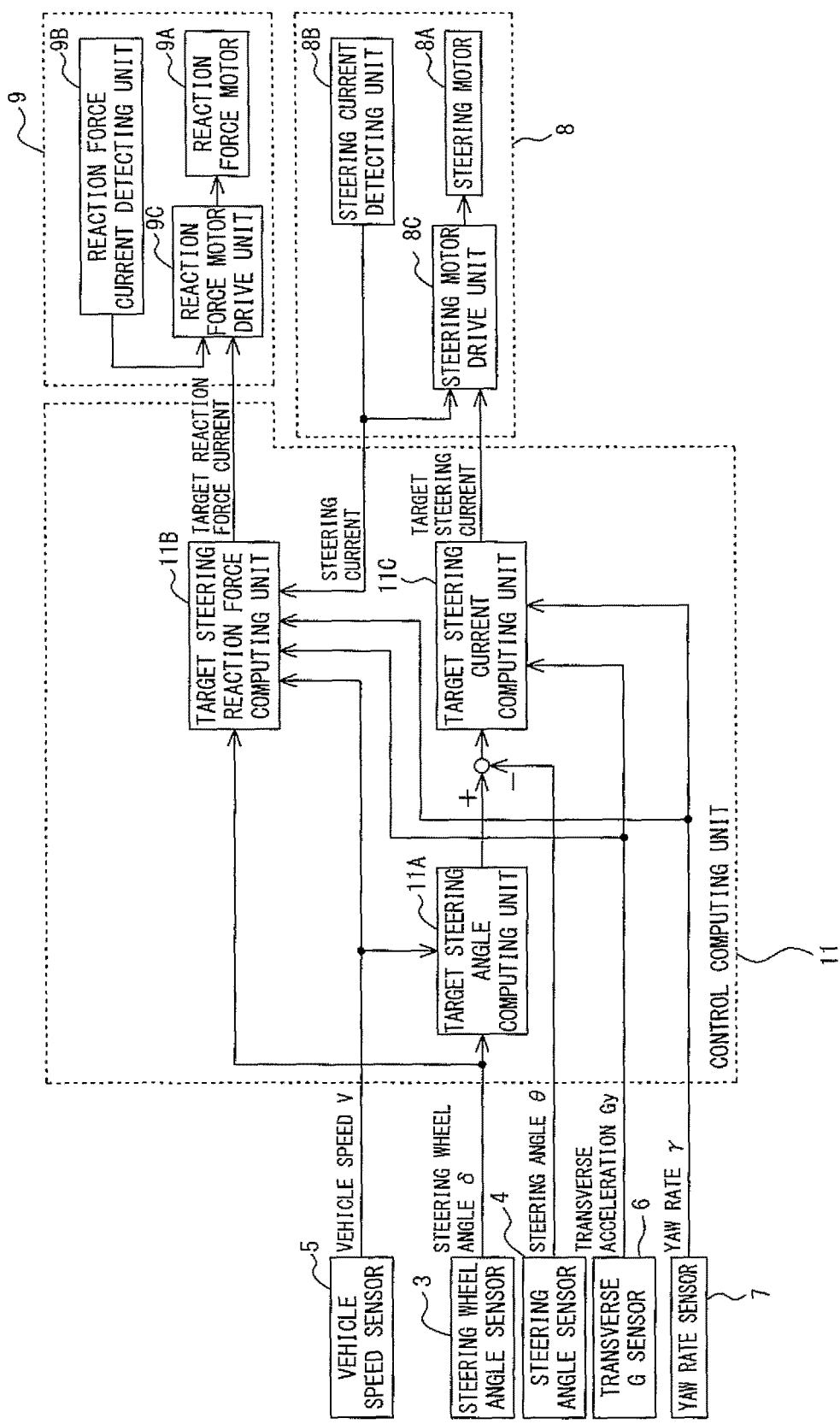
FIG. 9 is a block diagram illustrating a configuration of a control computing unit 11.

FIG. 9 is a block diagram illustrating a configuration of the control computing unit 11. As illustrated in FIG. 9 and FIG. 3, the feedback axial force calculating unit 11Bb calculates a steering-rack axial force (feedback axial force) $T_{FB}$ according to the above formula 5 ($T_{FB}$=transverse-G axial force×$K_1$+current axial force×$K_2$+yaw-rate axial force×$K_3$) on the basis of the transverse-G axial force, the current axial force, and the yaw-rate axial force. Then, the feedback axial force calculating unit 11Bb outputs the calculation result to the final axial force calculating unit 11Bc.

Here, as the method of setting the allocation ratio $K_2$, a method of reading the allocation ratio $K_2$ corresponding to the absolute value of the transverse acceleration Gy from a control map M0 to be described later can be employed. As the method of setting the allocation ratios $K_1$ and $K_3$, a method of setting the allocation ratios according to a formula (8) on the basis of the allocation ratio $K_2$ read from the control map M0 such that the ratio between the allocation ratios $K_1$ and $K_3$ is a predetermined ratio (for example, 6:1), can be employed.

$$K_1=(1-K_2)\times 6/7$$

$$K_3=(1-K_2)\times 1/7 \tag{8}$$

Figure 10:
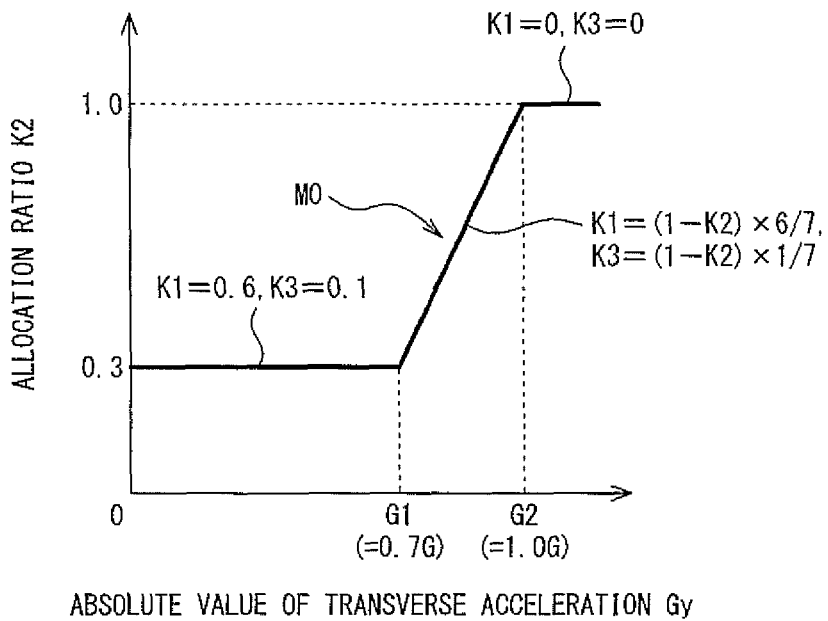
FIG. 10 is a graph illustrating a control map M0.
Figure 11:
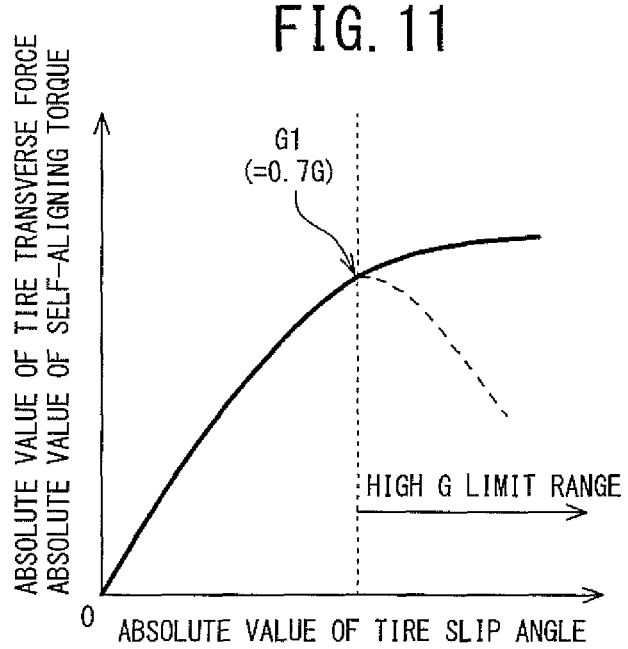
FIG. 11 is a diagram illustrating a tire transverse force and a self-aligning torque.

FIG. 10 is a graph illustrating the control map M0. As illustrated in FIG. 10, in the control map M0, the allocation ratio $K_2$ is set to a value (for example, 0.3) smaller than the sum $K_1+K_3$ ($=1-K_2$) of the other allocation ratios $K_1$ and $K_3$ regardless of the magnitude of the transverse acceleration Gy in a range in which the absolute value of the transverse acceleration Gy is equal to or greater than 0 and less than the first set value $G_1$ (>0). The first set value $G_1$ is a transverse acceleration Gy (for example, 0.7 G) at which the vehicle A reaches a high G limit range while the vehicle is traveling on a dry road. As illustrated in FIG. 11, the high G limit range is an area in which a degree of increase of the absolute value of the tire transverse force Fd with respect to a degree of increase of the absolute value of the tire slip angle decreases. In the high G limit range, since the degree of increase of the tire transverse force Fd with respect to the degree of increase of the absolute value of the tire slip angle decreases, the absolute value of a self-aligning torque decreases with an increase of the absolute value of the tire slip angle. Specifically, in the control map M0, a transverse acceleration Gy in which a difference between the behavior (for example, the tire transverse force Fd) of the vehicle A calculated according to a predetermined model formula on the basis of a driver's driving operation (for example, the steering angle θ (=steering wheel angle δ×gear ratio) and the vehicle speed V) and the actual behavior of the vehicle A is equal to or greater than a predetermined vehicle behavior threshold value is set as the first set value $G_1$.

As the predetermined model formula, for example, the formula (1) can be employed, in the formula (1), the degree of increase of the absolute value of the tire transverse force Fd with respect to the degree of increase of the absolute value of the tire slip angle does not decrease. As the calculating formula of the actual vehicle behavior (actual tire transverse force Fd), for example, the formula (5) can be employed, in the formula (5), the allocation ratios $K_1$, $K_2$, and $K_3$ are set to 0.6, 0.3, and 0.1, respectively, can be employed. As the vehicle behavior threshold value, for example, a value at which the degree of increase of the absolute value of the tire transverse force Fd with respect to the degree of increase of the absolute value of the tire slip angle starts decreasing, or a value at which the absolute value of the self-aligning torque starts decreasing with the increase of the absolute value of the tire slip angle can be employed. The first set value $G_1$ is set in advance at the time of manufacturing the vehicle A or the like by experiments using the actual vehicle A, simulations, or the like.

Referring to FIG. 10 again, in the control map M0, the allocation ratio $K_2$ is set to a value (for example, 1.0 G) greater than the sum $K_1+K_3$ ($=1-K_2$) of the other allocation ratios $K_1$ and $K_3$ regardless of the magnitude of the transverse acceleration Gy in a range in which the absolute value of the transverse acceleration Gy is equal to or greater than a second set value $G_2$ ($>G_1$). The second set value $G_2$ is a transverse acceleration Gy (for example, 1.0 G) in which the absolute value of the tire transverse force Fd becomes the maximum value (saturated value), the absolute value of the tire transverse force increasing with the increase of the absolute value of the tire slip angle.

In the control map M0, the allocation ratio $K_2$ is made to linearly increase with the increase of the absolute value of the transverse acceleration Gy in a range in which the absolute value of the transverse acceleration Gy is equal to or greater than the first set value $G_1$ and less than the second set value $G_2$. Specifically, in the control map M0, the relationship between the absolute value of the transverse acceleration Gy and the allocation ratio $K_2$ is represented by a linear function in the range in which the absolute value of the transverse acceleration Gy is equal to or greater than the first set value $G_1$ and less than the second set value $G_2$. In the linear function, the allocation ratio $K_2$ is calculated to be 0.3 when the absolute value of the transverse acceleration Gy is equal to the first set value $G_1$, and the allocation ratio $K_2$ is calculated to 1.0 when the absolute value of the transverse acceleration Gy is equal to the second set value $G_2$.

Figures 12A, 12B, 12C:
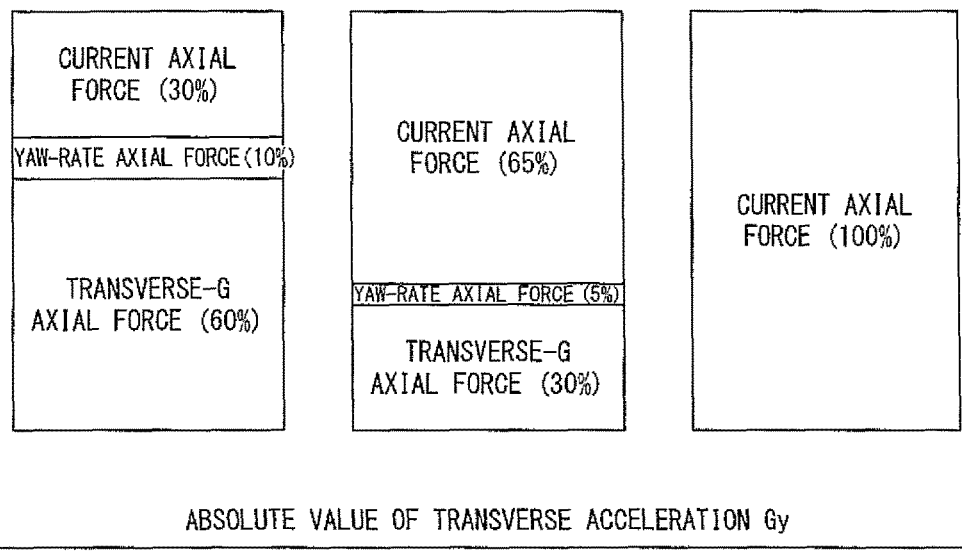
FIGS. 12A to 12C are diagrams illustrating allocation ratios of a current axial force, a yaw-rate axial force, and a transverse-G axial force.

Accordingly, when the absolute value of the transverse acceleration Gy is equal to or greater than 0 and less than the first set value $G_1$, the feedback axial force calculating unit 11Bb sets the sum obtained by mixing the transverse-G axial force, the current axial force, and the yaw-rate axial force at the allocation ratios of 60%, 30%, and 10% ($K_1$=0.6, $K_2$=0.3, $K_3$=0.1) as the feedback axial force $T_{FB}$ as illustrated in FIG. 12A. When the absolute value of the transverse acceleration Gy is equal to or greater than the second set value $G_2$, the feedback axial force calculating unit 11Bb sets the current axial force as the feedback axial force $T_{FB}$ as illustrated in FIG. 12C. When the absolute value of the transverse acceleration Gy is equal to or greater than the first set value $G_1$ and less than the second set value $G_2$, the feedback axial force calculating unit 11Bb sets the sum of a value obtained by multiplying the transverse-G axial force by $K_1=(1-K_2)\times6/7$, a value obtained by multiplying the current axial force by $K_2$, and a value obtained by multiplying the yaw-rate axial force by $K_3=(1-K_2)\times1/7$ as the feedback axial force $T_{FB}$ as illustrated in FIG. 12B. Accordingly, the feedback axial force calculating unit 11Bb calculates the steering-rack axial force reflecting the influence of the tire transverse force Fd acting on the steered wheels 2 as the feedback axial force $T_{FB}$.

In this way, when the absolute value of the transverse acceleration Gy is equal to or greater than 0 and less than the first set value $G_1$, the feedback axial force calculating unit 11Bb according to this embodiment calculates the feedback axial force $T_{FB}$ on the basis of the value obtained by multiplying the current axial force by the allocation ratio $K_2$ and the value obtained by multiplying the transverse-G axial force by the allocation ratio $K_1$. Here, when road surface disturbance acts on the steered wheels 2 of the vehicle A due to road surface unevenness or the like and the tire transverse force Fd acts on the steered wheels 2, a difference is generated between the target steering angle θ* and the actual steering angle θ. Therefore, the control computing unit 11 according to this embodiment can reflect the influence of the road surface disturbance acting on the steered wheels 2 due to road surface unevenness or the like in the feedback axial force $T_{FB}$ by adding the current axial force to the transverse-G axial force, and thus can calculate a more appropriate feedback axial force $T_{FB}$. Accordingly, the control computing unit 11 according to this embodiment can apply a more appropriate steering reaction force by driving the reaction force motor 9A on the basis of the feedback axial force $T_{FB}$.

When the absolute value of the transverse acceleration Gy is equal to or greater than 0 and less than the first set value $G_1$, the feedback axial force calculating unit 11Bb according to this embodiment sets the allocation ratio $K_1$ of the transverse-G axial force to be greater than the allocation ratio $K_2$ of the current axial force. Therefore, the feedback axial force calculating unit 11Bb according to this embodiment can reduce the allocation ratio of the current axial force, and thus can suppress the decrease in the estimation accuracy of the feedback axial force $T_{FB}$, for example, even when the estimation accuracy of the current axial force decreases due to the influence of inertia of the steering motor 8A or friction. Accordingly, the control computing unit 11 according to this embodiment can apply a more appropriate steering reaction force by driving the reaction force motor 9A on the basis of the feedback axial force $T_{FB}$.

When the absolute value of the transverse acceleration Gy is equal to or greater than 0 and less than the first set value $G_1$, the feedback axial force calculating unit 11Bb according to this embodiment calculates the feedback axial force $T_{FB}$ on the basis of the value obtained by multiplying the current axial force by the allocation ratio $K_2$, the value obtained by multiplying the transverse-G axial force by the allocation ratio $K_1$, and the value obtained by multiplying the yaw-rate axial force by the allocation ratio $K_3$. Here, for example, when the vehicle A is in a spinning state, the steering current and the transverse acceleration Gy increase and thus both the detection result of the transverse G sensor 6 and the detection result of the steering current detecting unit 8B become the maximum values (saturated values). On the other hand, the yaw rate γ increases, but since the degree of increase of the yaw rate γ is relatively small, the detection result of the yaw rate sensor 7 does not reach the maximum value (saturated value). Accordingly, the detection result of the yaw rate sensor 7 varies depending on the degree of the spinning state of the vehicle A. Therefore, the feedback axial force calculating unit 11Bb according to this embodiment can change the feedback axial force $T_{FB}$ depending on the degree of the spinning state of the vehicle A. As a result, the control computing unit 11 according to this embodiment can apply a more appropriate steering reaction force by driving the reaction force motor 9A on the basis of the feedback axial force $T_{FB}$.

When the absolute value of the transverse acceleration Gy is equal to or greater than the first set value $G_1$ and less than the second set value $G_2$, the feedback axial force calculating unit 11Bb according to this embodiment increases the allocation ratio $K_2$ of the current axial force with the increase of the absolute value of the transverse acceleration Gy. Here, when the absolute value of the transverse acceleration Gy is equal to or greater than the first set value $G_1$ (0.7 G) that is, when the vehicle A is in the high G limit range, the transverse-G axial force increases up to the maximum value (saturated value) with the increase of the absolute value of the tire slip angle. On the contrary, the current axial force decreases with the increase of the absolute value of the tire slip angle. Accordingly, when the absolute value of the tire slip angle increases and the absolute value of the transverse acceleration Gy increases, the feedback axial force calculating unit 11Bb according to this embodiment can decrease the absolute value of the feedback axial force $T_{FB}$ by increasing the allocation ratio $K_2$ of the current axial force with the increase of the absolute value of the transverse acceleration Gy. Accordingly, when the vehicle A is in the high G limit range as illustrated in FIG. 11, it is possible to decrease the absolute value of the feedback axial force $T_{FB}$ similarly to the self-aligning torque. As a result, the control computing unit 11 according to this embodiment can reduce the steering reaction force by driving the reaction force motor 9A on the basis of the feedback axial force $T_{FB}$ and can provide a feeling of loss of reaction force (limit sensitivity). Accordingly, the control computing unit 11 according to this embodiment can apply a steering reaction force corresponding to a self-aligning torque, that is, a steering reaction force corresponding to an actual vehicle behavior. The other configurations are the same as the configurations of the first embodiment.

The operation of the steering control apparatus of the vehicle A will be described below. It is assumed that a driver steers the steering wheel 1 while the vehicle A is traveling. Then, the control computing unit 11 calculates the target steering angle θ* on the basis of the steering wheel angle δ and the vehicle speed (the target steering angle computing unit 11A illustrated in FIG. 9). Subsequently, the control computing unit 11 calculates the target steering current on the basis of the subtraction result obtained by subtracting the actual steering angle θ from the calculated target steering angle θ* (the target steering current computing unit 11C illustrated in FIG. 9). Accordingly, the steering control unit 8 steers the steered wheels 2 in response to the driver's steering operation.

The control computing unit 11 also calculates the feedforward axial force $T_{FF}$ on the basis of the steering wheel angle δ and the vehicle speed V (the feedforward axial force calculating unit 11Ba illustrated in FIG. 3). Subsequently, the control computing unit 11 calculates the transverse-G axial force on the basis of the transverse acceleration Gy (the feedback axial force calculating unit 11Bb illustrated in FIG. 3). Subsequently, the control computing unit 11 calculates the current axial force on the basis of the steering current (the feedback axial force calculating unit 11Bb illustrated in FIG. 3). Subsequently, the control computing unit 11 calculates the yaw-rate axial force on the basis of the yaw rate γ and the vehicle speed V (the feedback axial force calculating unit 11Bb illustrated in FIG. 3). Here, it is assumed that the absolute value of the tire slip angle increases by the steering the steered wheels 2, the tire transverse force Fd increases, and the transverse acceleration Gy which is equal to or greater than 0 and less than the first set value $G_1$ is generated. Then, the control computing unit 11 sets the allocation ratios $K_1$, $K_2$, and $K_3$ to 0.6, 0.3, and 0.1, respectively, as illustrated in FIG. 10. Subsequently, the control computing unit 11 calculates the feedback axial force $T_{FB}$ on the basis of the value obtained by multiplying the calculated current axial force by the allocation ratio $K_2$ and the value obtained by multiplying the transverse-G axial force by the allocation ratio $K_1$, and the value obtained by multiplying the yaw-rate axial force by the allocation ratio $K_3$ (the feedback axial force calculating unit 11Bb illustrated in FIG. 3). That is, as illustrated in FIG. 12A, the sum obtained by mixing the transverse-G axial force, the current axial force, and the yaw-rate axial force at the allocation ratios of 60%, 30%, and 10% ($K_1$=0.6, $K_2$=0.3, and $K_3$=0.1) is set as the feedback axial force $T_{FB}$.

Subsequently, the control computing unit 11 allocates the calculated feedforward axial force $T_{FF}$ and the calculated feedback axial force $T_{FB}$ at $G_F:(1-G_F)$ and calculates the final axial force (the final axial force calculating unit 11Bc illustrated in FIG. 3). Subsequently, the control computing unit 11 calculates the target steering reaction force on the basis of the calculated final axial force (the axial force-steering reaction force conversion unit 11Bd illustrated in FIG. 3). Subsequently, the control computing unit 11 calculates the target reaction force current on the basis of the calculated target steering reaction force (the target reaction force current computing unit 11Be illustrated in FIG. 3). Subsequently, the control computing unit 11 drives the reaction force motor 9A on the basis of the calculated target reaction force current (the reaction force motor drive unit 9C illustrated in FIG. 9). Accordingly, the reaction force control unit 9 applies the steering reaction force to the steering wheel 1.

In this way, when the absolute value of the transverse acceleration Gy is equal to or greater than 0 and less than the first set value $G_1$, the steering control apparatus according to this embodiment sets the allocation ratio $K_1$ of the transverse-G axial force to be greater than the allocation ratio $K_2$ of the current axial force ($K_2$=0.3 and $K_1$=0.6). Therefore, the steering control apparatus according to this embodiment can reduce the allocation ratio $K_2$ of the current axial force. Accordingly, for example, even when the estimation accuracy of the current axial force is lower than that of the actual steering-rack axial force due to an influence of inertia of the steering motor 8A or friction, it is possible to suppress a decrease of the estimation accuracy of the feedback axial force $T_{FB}$. Accordingly, in the steering control apparatus according to this embodiment, it is possible to apply a more appropriate steering reaction force by driving the reaction force motor 9A on the basis of the feedback axial force $T_{FB}$.

Here, it is assumed that the driver continues to perform a steering operation, the absolute value of the tire slip angle increases due to the steering of steered wheels 2, the absolute value of the tire transverse force Fd increases, and the transverse acceleration Gy which is equal to or greater than the first set value $G_1$ and less than the second set value $G_2$ is generated. Then, the vehicle A reaches the high G limit range, and the degree of increase of the absolute value of the tire transverse force Fd with respect to the degree of increase of the absolute value of the tire slip angle decreases, as illustrated in FIG. 11. Accordingly, the absolute value of the self-aligning torque decreases with the increase of the absolute value of the tire slip angle, and the absolute value of the tire transverse force Fd deviates from the absolute value of the self-aligning torque. Then, the control computing unit 11 gradually increases the allocation ratio $K_2$ of the current axial force from 0.3 with the increase of the absolute value of the transverse acceleration Gy as illustrated in FIG. 10 (the feedback axial force calculating unit 11Bb illustrated in FIG. 3). The control computing unit 11 gradually decreases the allocation ratio $K_1$ of the transverse-G axial force and the allocation ratio $K_3$ of the yaw-rate axial force from 0.6 and 0.1, respectively (the feedback axial force calculating unit 11Bb illustrated in FIG. 3). Accordingly, as illustrated in FIGS. 12B and 12C, the allocation ratio of the current axial force gradually increases with the increase of the absolute value of the transverse acceleration Gy and the allocation ratios of the transverse-G axial force and the yaw-rate axial force gradually decrease. The control computing unit 11 sets the sum obtained by mixing the current axial force, the transverse-G axial force, and the yaw-rate axial force at the allocation ratios as the feedback axial force $T_{FB}$ (the feedback axial force calculating unit 11Bb illustrated in FIG. 3).

In this way, when the absolute value of the transverse acceleration Gy is equal to or greater than the first set value $G_1$ and less than the second set value $G_2$, the control computing unit 11 according to this embodiment increases the allocation ratio $K_2$ of the current axial force with the increase of the absolute value of the transverse acceleration Gy. Here, when the absolute value of the transverse acceleration Gy is equal to or greater than the first set value $G_1$ (0.7 G), that is, when the vehicle A is in the high G limit range, the transverse-G axial force increases up to the maximum value (saturated value) with the increase of the absolute value of the tire slip angle. On the contrary, the current axial force decreases with the increase of the absolute value of the tire slip angle. Accordingly, when the absolute value of the tire slip angle increases and the absolute value of the transverse acceleration Gy increases, the control computing unit 11 according to this embodiment can decrease the absolute value of the feedback axial force $T_{FB}$ by increasing the allocation ratio $K_2$ of the current axial force with the increase of the absolute value of the transverse acceleration Gy. Accordingly, when the vehicle A is in the high G limit range as illustrated in FIG. 11, it is possible to decrease the feedback axial force $T_{FB}$ similarly to the self-aligning torque. As a result, the control computing unit 11 according to this embodiment can reduce the steering reaction force by driving the reaction force motor 9A on the basis of the feedback axial force $T_{FB}$ and can provide a feeling of loss of reaction force (limit sensitivity). Accordingly, the control computing unit 11 according to this embodiment can apply the steering reaction force corresponding to the self-aligning torque, that is, the steering reaction force corresponding to the actual vehicle behavior.

In this embodiment, the steering wheel 1 illustrated in FIG. 1 corresponds to the steering wheel. Similarly, the steering wheel angle sensor 3 illustrated in FIG. 1 corresponds to the steering wheel angle detecting unit. The steering motor 8A illustrated in FIG. 1 corresponds to the steering motor. The steering motor drive unit 8C illustrated in FIG. 1 corresponds to the steering motor drive unit. The steering current detecting unit 8B illustrated in FIG. 1 corresponds to the steering current detecting unit. The transverse G sensor 6 illustrated in FIG. 1 corresponds to the transverse acceleration detecting unit. The reaction force motor 9A illustrated in FIG. 1 corresponds to the reaction force motor. The feedback axial force calculating unit 11Bb illustrated in FIG. 3 corresponds to the current axial force calculating unit, the transverse-G axial force calculating unit, the feedback axial force calculating unit, the steering reaction force calculating unit, and the yaw-rate axial force calculating unit. The reaction force motor drive unit 9C and the target steering reaction force computing unit 11B illustrated in FIG. 1 correspond to the reaction force motor drive unit. The first set value $G_1$ corresponds to the transverse acceleration threshold value. The yaw rate sensor 7 illustrated in FIG. 1 corresponds to the yaw rate detecting unit.

This embodiment has the following effects in addition to the effects of the first embodiment.

(1) When the absolute value of the transverse acceleration Gy is equal to or greater than the first set value $G_1$, the control computing unit 11 increases the allocation ratio $K_2$ of the current axial force with the increase of the absolute value of the transverse acceleration Gy. According to this configuration, when the absolute value of the transverse acceleration Gy is equal to or greater than the first set value $G_1$ and the absolute value of the transverse acceleration Gy increases so that the absolute value of the tire transverse force Fd becomes the saturated value, it is possible to reduce the absolute value of the steering reaction force by increasing the allocation ratio $K_2$ of the current axial force with the increase of the absolute value of the transverse acceleration Gy. Accordingly, it is possible to apply a steering reaction force corresponding to the actual vehicle behavior.

(2) The control computing unit 11 sets the first set value $G_1$ to the transverse acceleration Gy in which a difference between the behavior (hereinafter, also referred to as computed vehicle behavior) of the vehicle A calculated according to a predetermined model formula on the basis of a driver's driving operation and the actual behavior of the vehicle A is equal to or greater than a predetermined vehicle behavior threshold value. According to this configuration, when the absolute value of the transverse acceleration Gy increases so that the absolute value of the tire transverse force Fd becomes the saturated value, the difference between the computed vehicle behavior and the actual behavior of the vehicle A tends to increase and the absolute value of the self-aligning torque tends to decrease. Therefore, by setting the first set value $G_1$ to the transverse acceleration Gy in which the difference between the computed tire transverse force Fd and the actual tire transverse force Fd is equal to or greater than the predetermined vehicle behavior threshold value, the transverse acceleration Gy in which the absolute value of the self-aligning torque tends to decrease can be set as the vehicle behavior threshold value.

(3) The control computing unit 11 allocates the current axial force and the transverse-G axial force at the predetermined allocation ratios $K_2$ and $K_1$ and calculates the feedback axial force $T_{FB}$ which is a steering-rack axial force. Then, the control computing unit 11 drives the reaction force motor 9A on the basis of the calculated feedback axial force $T_{FB}$. The allocation ratio $K_1$ of the transverse-G axial force is set to be greater than the allocation ratio $K_2$ of the current axial force. According to this configuration, the current axial force and the transverse-G axial force are allocated at the predetermined allocation ratios $K_2$ and $K_1$ to calculate the feedback axial force $T_{FB}$. Therefore, it is possible to compensate for the phase delay due to the transverse-G axial force. Accordingly, it is possible to calculate a more appropriate feedback axial force $T_{FB}$ and thus to apply a more appropriate steering reaction force.

For example, when road surface disturbance acts on the steered wheels 2 due to road surface unevenness or the like, the tire transverse force Fd acts on the steered wheels 2, and a difference is generated between the target steering angle θ* and the actual steering angle θ, it is possible to change the feedback axial force $T_{FB}$ depending on the degree of road surface disturbance acting on the steered wheels 2. Accordingly, it is possible to calculate a more appropriate feedback axial force $T_{FB}$ and thus to apply a more appropriate steering reaction force. The allocation ratio $K_1$ of the transverse-G axial force is set to be greater than the allocation ratio $K_2$ of the current axial force. Therefore, for example, even when the estimation accuracy of the current axial force becomes lower than that of the actual steering-rack axial force due to the influence of inertia of the steering motor 8A or friction, it is possible to suppress a decrease in the estimation accuracy of the feedback axial force $T_{FB}$. Accordingly, it is possible to calculate a more appropriate feedback axial force $T_{FB}$ and thus to apply a more appropriate steering reaction force.

(4) The control computing unit 11 allocates the current axial force, the transverse-G axial force, and the yaw-rate axial force at the predetermined allocations ratios $K_2$, $K_1$, and $K_3$ and calculates the feedback axial force $T_{FB}$. According to this configuration, for example, when the vehicle A is in a spinning state, the steering current and the transverse acceleration Gy increase and thus both the detection result of the transverse G sensor 6 and the detection result of the steering current detecting unit 8B become the maximum values (saturated values). On the other hand, the yaw rate γ increases, but since the degree of increase of the yaw rate γ is relatively small, the detection result of the yaw rate sensor 7 does not reach the maximum value (saturated value). Accordingly, the detection result of the yaw rate sensor 7 varies depending on the degree of the spinning state of the vehicle A. Therefore, it is possible to change the feedback axial force $T_{FB}$ depending on the degree of the spinning state of the vehicle A. As a result, it is possible to calculate a more appropriate feedback axial force $T_{FB}$ and thus to apply a more appropriate steering reaction force.

Figure 13:
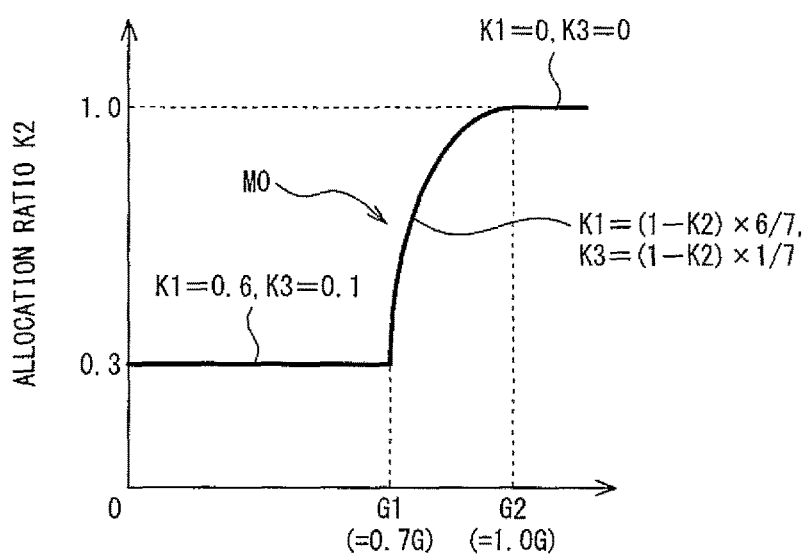
FIG. 13 is a graph illustrating a control map M0.

FIG. 13 is a diagram illustrating an application example. This embodiment describes the example where the allocation ratio $K_2$ is calculated according to a linear function representing the relationship between the transverse acceleration Gy and the allocation ratio $K_2$ when the absolute value of the transverse acceleration Gy is equal to or greater than the first set value $G_1$ and less than the second set value $G_2$ as illustrated in FIG. 10, but other configurations may be employed. For example, as illustrated in FIG. 13, the allocation ratio $K_2$ may be calculated according to an upward-convex function (for example, quadratic function) representing the relationship between the transverse acceleration Gy and the allocation ratio $K_2$. In the quadratic function, the allocation ratio $K_2$ is set to 0.3 when the absolute value of the transverse acceleration Gy is equal to the first set value $G_1$, and the allocation ratio $K_2$ is set to 1.0 when the absolute value of the transverse acceleration Gy is equal to the second set value $G_2$. In the quadratic function, the smaller the absolute value of the transverse acceleration Gy is, the larger the degree of increase of the allocation ratio $K_2$ with respect to the increase of the absolute value of the transverse acceleration Gy is.

This application example has the following effects in addition to the effects of the above-mentioned embodiments.

(1) When the absolute value of the transverse acceleration Gy is equal to or greater than the first set value $G_1$, the control computing unit 11 sets the degree of increase of the allocation ratio $K_2$ of the current axial force with respect to the degree of increase of the absolute value of the transverse acceleration Gy to increase with the decrease of the absolute value of the transverse acceleration Gy. According to this configuration, when the absolute value of the transverse acceleration Gy is equal to or greater than the first set value $G_1$, it is possible to immediately increase the allocation ratio $K_2$ of the current axial force and to immediately decrease the absolute value of the steering reaction force. Accordingly, it is possible to immediately provide a driver with a feeling of loss of reaction force.

While the present invention has been described with reference to the definite number of embodiments, the scope of the present invention is not limited thereto and improvements and modifications of the embodiments based on the above disclosure are obvious to those skilled in the art.

The invention claimed is:

1. A steering control apparatus comprising:
   a steering wheel mechanically separated from wheels to be steered;
   a steering wheel angle detecting unit configured to detect a steering wheel angle of the steering wheel;
   a steering motor configured to steer the wheels;
   a steering motor drive unit configured to drive the steering motor on the basis of the steering wheel angle detected by the steering wheel angle detecting unit;
   a steering current detecting unit configured to detect a steering current which is a current for driving the steering motor;
   a transverse acceleration detecting unit configured to detect a transverse acceleration of a vehicle;
   a reaction force motor configured to apply a steering reaction force to the steering wheel;
   a current axial force calculating unit configured to calculate a current axial force by multiplying the steering current detected by the steering current detecting unit by a gear ratio of a motor gear for transmitting a motor torque of the steering motor and dividing the result of the multiplication by a product of a pinion radius of a pinion gear associated with the steering motor;
   a transverse-G axial force calculating unit configured to calculate a transverse-G axial force on the basis of the transverse acceleration detected by the transverse acceleration detecting unit;
   a feedback axial force calculating unit configured to sum a first product of the current axial force and a first coefficient and a second product of the transverse-G axial force and a second coefficient to calculate a feedback axial force;
   a steering reaction force calculating unit configured to calculate the steering reaction force on the basis of the feedback axial force calculated by the feedback axial force calculating unit; and a reaction force motor drive unit configured to drive the reaction force motor on the basis of the steering reaction force calculated by the steering reaction force calculating unit, wherein the feedback axial force calculating unit sets the second coefficient to be greater than the first coefficient when an absolute value of the transverse acceleration detected by the transverse acceleration detecting unit is less than a predetermined transverse acceleration threshold value.

2. The steering control apparatus according to claim 1, further comprising:
a yaw rate detecting unit configured to detect a yaw rate of the vehicle; and
a yaw-rate axial force calculating unit configured to calculate a yaw-rate axial force on the basis of the yaw rate detected by the yaw rate detecting unit,
wherein the feedback axial force calculating unit sums the first product of the current axial force and the first coefficient, the second product of the transverse-G axial force and the second coefficient, and a third product of the yaw-rate axial force and a third coefficient to calculate the feedback axial force.

3. The steering control apparatus according to claim 1, further comprising:
a vehicle speed detecting unit configured to detect a vehicle speed of the vehicle; and
a feedforward axial force calculating unit configured to calculate a feedforward axial force on the basis of the steering wheel angle detected by the steering wheel angle detecting unit and the vehicle speed detected by the vehicle speed detecting unit,
wherein the steering reaction force calculating unit allocates the feedback axial force calculated by the feedback axial force calculating unit and the feedforward axial force calculated by the feedforward axial force calculating unit at a set allocation ratio to calculate the steering reaction force.

4. The steering control apparatus according to claim 1, wherein the feedback axial force calculating unit increases the first coefficient with an increase of an absolute value of the transverse acceleration detected by the transverse acceleration detecting unit when the absolute value of the transverse acceleration detected by the transverse acceleration detecting unit is equal to or greater than a predetermined transverse acceleration threshold value.

5. The steering control apparatus according to claim 4, wherein the transverse acceleration threshold value is set to the transverse acceleration of the vehicle in which a difference between calculated behavior of the vehicle according to a predetermined model formula on the basis of a driver's driving operation and actual behavior of the vehicle is equal to or greater than a predetermined vehicle behavior threshold value.

6. The steering control apparatus according to claim 4, wherein when the transverse acceleration detected by the transverse acceleration detecting unit is equal to or greater than the predetermined transverse acceleration threshold value, the feedback axial force calculating unit sets a degree of increase of the first coefficient with respect to a degree of increase of the absolute value of the transverse acceleration detected by the transverse acceleration detecting unit to become greater as the absolute value of the transverse acceleration detected by the transverse acceleration detecting unit becomes smaller.

7. The steering control apparatus according to claim 4, wherein when the transverse acceleration detected by the transverse acceleration detecting unit is less than the transverse acceleration threshold value, the feedback axial force calculating unit sets the second coefficient to be greater than the first coefficient.

8. The steering control apparatus according to claim 4, further comprising:
a yaw rate detecting unit configured to detect a yaw rate of the vehicle; and
a yaw-rate axial force calculating unit configured to calculate a yaw-rate axial force on the basis of the yaw rate detected by the yaw rate detecting unit,
wherein the feedback axial force calculating unit sums the first product of the current axial force and the first coefficient, the second product of the transverse-G axial force and the second coefficient, and a third product of the yaw-rate axial force and a third coefficient to calculate the feedback axial force.

9. A steering control apparatus comprising:
a steering wheel angle detecting means for detecting a steering wheel angle of a steering wheel mechanically separated from wheels to be steered;
a steering motor drive means for driving a steering motor on the basis of the steering wheel angle detected by the steering wheel angle detecting means, the steering motor being configured to steer the wheels;
a steering current detecting means for detecting a steering current which is a current for driving the steering motor;
a transverse acceleration detecting means for detecting a transverse acceleration of a vehicle;
a current axial force calculating means for calculating a current axial force by multiplying the steering current detected by the steering current detecting means by a gear ratio of a motor gear for transmitting a motor torque of the steering motor and dividing the result of the multiplication by a product of a pinion radius of a pinion gear associated with the steering motor;
a transverse-G axial force calculating means for calculating a transverse-G axial force on the basis of the transverse acceleration detected by the transverse acceleration detecting means;
an axial force allocation means for summing a first product of the current axial force and a first coefficient, and a second product of and the transverse-G axial force and a second coefficient to calculate a feedback axial force;
a steering reaction force calculating means for calculating a steering reaction force to be applied by a reaction force motor to the steering wheel on the basis of the feedback axial force calculated by the axial force allocation means; and
a reaction force motor drive means for driving the reaction force motor on the basis of the steering reaction force calculated by the steering reaction force calculating means,
wherein the second coefficient is set to be greater than the first coefficient when an absolute value of the transverse acceleration detected by the transverse acceleration detecting means is less than a predetermined transverse acceleration threshold value.

10. A steering control method comprising:
detecting a steering wheel angle of a steering wheel mechanically separated from wheels to be steered;
driving a steering motor on the basis of the detected steering wheel angle, the steering motor being configured to steer the wheels;

detecting a steering current which is a current for driving the steering motor;
detecting a transverse acceleration of a vehicle;
calculating a current axial force by multiplying the detected steering current by a gear ratio of a motor gear for transmitting a motor torque of the steering motor and dividing the result of the multiplication by a product of a pinion radius of a pinion gear associated with the steering motor;
calculating a transverse-G axial force on the basis of the detected transverse acceleration;
summing a first product of the calculated current axial force and a first coefficient, and a second product of the calculated transverse-G axial force and a second coefficient to calculate a feedback axial force;
calculating a steering reaction force to be applied by a reaction force motor to the steering wheel on the basis of the calculated feedback axial force; and
driving the reaction force motor on the basis of the calculated steering reaction force,
wherein the second coefficient is set to be greater than the first coefficient when an absolute value of the detected transverse acceleration is less than a predetermined transverse acceleration threshold value.

* * * * *